United States Patent
Akkarakaran et al.

(10) Patent No.: US 11,122,512 B2
(45) Date of Patent: Sep. 14, 2021

(54) MODEM-BASED FORM FACTOR SENSOR

(71) Applicant: QUALCOMM Incorporated, San Diego, CA (US)

(72) Inventors: Sony Akkarakaran, Poway, CA (US); Mohammad Ali Tassoudji, San Diego, CA (US); Tao Luo, San Diego, CA (US); Roberto Rimini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/700,093

(22) Filed: Dec. 2, 2019

(65) Prior Publication Data

US 2020/0205073 A1 Jun. 25, 2020

Related U.S. Application Data

(60) Provisional application No. 62/783,736, filed on Dec. 21, 2018.

(51) Int. Cl.
*H04W 24/02* (2009.01)
*H04W 52/02* (2009.01)
(Continued)

(52) U.S. Cl.
CPC ......... *H04W 52/028* (2013.01); *H04W 24/08* (2013.01); *H04W 24/10* (2013.01); *H04W 88/06* (2013.01)

(58) Field of Classification Search
CPC ... H04W 72/082; H04W 48/16; H04W 24/02; H04W 24/08; H04W 18/16; G01S 15/74
(Continued)

(56) References Cited

U.S. PATENT DOCUMENTS 3,870,988 A * 3/1975 Turner ................. G01S 15/74
367/92
6,581,459 B1 * 6/2003 Lichtenfels, II .... G01F 23/0076
73/290 V
(Continued)

FOREIGN PATENT DOCUMENTS

KR 101951530 B1 * 2/2015 ........... G06F 1/1698
WO WO-2018107421 A1 6/2018
(Continued)

OTHER PUBLICATIONS

"Modeling of RF security system using smart antennas." Ayodele S. Oluwole; Viranjay M. Srivastava, Published in: 2015 International Conference on Cyberspace (CYBER-Abuja), Nov. 2015 (Year: 2015).*

(Continued)

*Primary Examiner* — William D Cumming
(74) *Attorney, Agent, or Firm* — QUALCOMM Incorporated

(57) ABSTRACT

Methods, systems, and devices for wireless communications are described. A user equipment (UE) may be configured to be positioned in different possible physical configurations and may identify its current physical configuration based on a modem-based sensor. The UE may transmit a signal from a first antenna element and receive an echo of the signal at a second antenna element different than the first antenna element. The UE may then generate an echo signature for the echo of the signal and determine that the UE is in a first physical configuration (e.g., its current physical configuration) from the possible physical configurations by comparing the generated echo signature to a set of echo signatures that correspond to each of the possible physical configurations. Accordingly, based on the determined first physical
(Continued)

US 11,122,512 B2

Page 2 configuration, the UE may perform an operating system function that corresponds to the first physical configuration.

29 Claims, 14 Drawing Sheets

(51) Int. Cl.
*H04W 24/10* (2009.01)
*H04W 88/06* (2009.01)
*H04W 24/08* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 7,103,500 | B2* | 9/2006 | Freger | G01S 7/292 |
| | | | | 702/158 |
| 7,740,179 | B2* | 6/2010 | Mattlin | G06K 17/00 |
| | | | | 235/492 |
| 8,033,478 | B2* | 10/2011 | Mattlin | G06K 17/00 |
| | | | | 235/492 |
| 8,152,751 | B2* | 4/2012 | Roger | A61M 1/3639 |
| | | | | 604/4.01 |
| 8,603,020 | B2* | 12/2013 | Roger | A61M 1/3656 |
| | | | | 604/4.01 |
| 8,654,095 | B1 | 2/2014 | Cho et al. | |
| 8,795,217 | B2* | 8/2014 | Roger | A61M 1/3639 |
| | | | | 604/4.01 |
| 8,920,355 | B2* | 12/2014 | Roger | A61M 1/3607 |
| | | | | 604/6.06 |
| 9,089,654 | B2* | 7/2015 | Roger | A61M 1/3656 |
| 9,713,019 | B2* | 7/2017 | Negus | H04W 24/02 |
| 10,237,760 | B2* | 3/2019 | Negus | H04W 24/02 |
| 10,356,782 | B2* | 7/2019 | Negus | H04B 7/15592 |
| 10,706,811 | B2* | 7/2020 | Zhang | G06F 1/3215 |
| 10,735,979 | B2* | 8/2020 | Negus | H04B 7/0408 |
| 10,785,708 | B2* | 9/2020 | Soule Alaofe | H04W 48/10 |
| 2004/0181359 | A1* | 9/2004 | Freger | G01S 7/4004 |
| | | | | 702/149 |
| 2006/0169055 | A1* | 8/2006 | Agam | G01F 23/2962 |
| | | | | 73/861.23 |
| 2007/0138251 | A1* | 6/2007 | Mattlin | G06K 17/00 |
| | | | | 235/375 |
| 2008/0177591 | A1* | 7/2008 | Mattlin | G06K 17/00 |
| | | | | 705/7.29 |
| 2008/0195021 | A1* | 8/2008 | Roger | A61M 1/3639 |
| | | | | 604/4.01 |
| 2010/0206949 | A1* | 8/2010 | Mattlin | G06K 17/00 |
| | | | | 235/375 |
| 2012/0150091 | A1* | 6/2012 | Roger | A61M 1/3639 |
| | | | | 604/6.16 |
| 2012/0165719 | A1* | 6/2012 | Roger | A61M 1/3653 |
| | | | | 604/6.16 |
| 2012/0262367 | A1 | 10/2012 | Chiu et al. | |
| 2012/0265115 | A1* | 10/2012 | Roger | A61M 1/3607 |
| | | | | 604/4.01 |
| 2014/0088484 | A1* | 3/2014 | Roger | A61M 1/14 |
| | | | | 604/6.16 |
| 2014/0330193 | A1* | 11/2014 | Roger | A61M 1/3639 |
| | | | | 604/6.06 |
| 2015/0080782 | A1* | 3/2015 | Roger | A61M 1/3639 |
| | | | | 604/6.11 |
| 2015/0230105 | A1* | 8/2015 | Negus | H04W 24/02 |
| | | | | 370/329 |
| 2016/0135191 | A1* | 5/2016 | Negus | H04B 7/08 |
| | | | | 370/329 |
| 2016/0170568 | A1 | 6/2016 | Kontkanen | |
| 2017/0318482 | A1* | 11/2017 | Negus | H04W 24/02 |
| 2018/0038948 | A1 | 2/2018 | Kemppinen | |
| 2019/0159045 | A1* | 5/2019 | Negus | H04W 48/16 |
| 2020/0084701 | A1* | 3/2020 | Soule Alaofe | H04W 4/029 |
| 2020/0205073 | A1* | 6/2020 | Akkarakaran | G01S 7/41 |
| 2021/0084570 | A1* | 3/2021 | Soule Alaofe | H04W 48/16 |

FOREIGN PATENT DOCUMENTS

| | | | | |
|---|---|---|---|---|
| WO | WO2020/044192 | A1 * | 3/2020 | |
| WO | WO-2020131361 | A1 * | 6/2020 | G01S 13/88 |

OTHER PUBLICATIONS

Simultaneous Transmission and Reception: Algorithm, Design and System Level Performance by Yang-Seok Choi and Hooman Shirani-Mehr Published in: IEEE Transactions on Wireless Communications (vol. 12, Issue: 12, Dec. 2013) (Year: 2013).*

Wireless sensing and identification of passive electromagnetic sensors based on millimetre-wave FMCW RADAR by H. Aubert ;et al Published in: 2012 IEEE International Conference on RFID-Technologies Jan. 2013 (Year: 2013).*

International Search Report and Written Opinion—PCT/US2019/064291—ISA/EPO—dated Feb. 28, 2020.

* cited by examiner

MODEM-BASED FORM FACTOR SENSOR

CROSS REFERENCE

The present Application for Patent claims the benefit of U.S. Provisional Patent Application No. 62/783,736 by AKKARAKARAN, et al., entitled "MODEM-BASED FORM FACTOR SENSOR," filed Dec. 21, 2018, assigned to the assignee hereof, and which is expressly incorporated by reference herein.

BACKGROUND

The following relates generally to wireless communications, and more specifically to modem-based form factor sensing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Recently, UEs with variable form factors have increased in popularity. While form factor and cost considerations result in most UEs having a non-foldable display, as design complexity has decreased, UEs with flexible displays and moving parts have gained increasing traction. However, UEs with these variable form factors may present new challenges in wireless communications. For example, various operating system functions of the UE may depend on a current physical configuration or relative orientation of the parts according to a current form factor. As such, it may be desirable to develop efficient techniques for determining a current physical configuration of the UE to enable or disable the various operating system functions.

SUMMARY

The described techniques relate to improved methods, systems, devices, and apparatuses that support a modem-based form factor sensor. Generally, the described techniques provide for a user equipment (UE) that is configured to be positioned in different possible physical configurations (e.g., form factors) to identify its current physical configuration based on transmitting and receiving signaling from a modem-based sensor (e.g., a maximum permissible exposure (MPE) sensor, a form factor sensor, etc.). For example, the UE may transmit a signal from a first antenna element and receive an echo of the signal at a second antenna element different than the first antenna element. The UE may then generate an echo signature for the echo of the signal and determine that the UE is in a first physical configuration (e.g., its current physical configuration) from the possible physical configurations by comparing the generated echo signature to a set of echo signatures that correspond to each of the possible physical configurations. This generated echo signature may indicate how the echo of the signal looks (e.g., is received) at the UE after the signal reflects off an object and returns to the UE. In some cases, the UE may cancel mutual coupling (MC) between the first antenna element and the second antenna element in order to accurately generate the echo signature. Additionally, the echo signature may include a received power of the echo, a delay between transmission of the signal and detection of the echo, a delay spread of the signal, an angular spread of the signal, a power spectrum of the signal, or a combination thereof.

Accordingly, based on the determined first physical configuration, the UE may perform an operating system function that corresponds to the first physical configuration (e.g., switch on a display, switch off a display, etc.). In some case, the set of echo signatures that correspond to each of the possible physical configurations may be calibrated for the UE (e.g., stored in a memory of the UE) for the comparison to the generated echo signature. If the physical layout of the UE changes (e.g., a case or similar add-on is attached), the UE may re-calibrate the set of echo signatures that correspond to each of the possible physical configurations.

A method of wireless communication at a UE that is configured to be positioned in a set of different physical configurations is described. The method may include transmitting a signal from a first antenna element, generating an echo signature of the signal based on detecting an echo of the signal at a second antenna element that differs from the first antenna element, and determining that the UE is in a first physical configuration of the set of different physical configurations based on comparing the echo signature to a set of different echo signatures.

An apparatus for wireless communication at a UE that is configured to be positioned in a set of different physical configurations is described. The apparatus may include a processor, memory in electronic communication with the processor, and instructions stored in the memory. The instructions may be executable by the processor to cause the apparatus to transmit a signal from a first antenna element, generate an echo signature of the signal based on detecting an echo of the signal at a second antenna element that differs from the first antenna element, and determine that the UE is in a first physical configuration of the set of different physical configurations based on comparing the echo signature to a set of different echo signatures.

Another apparatus for wireless communication at a UE that is configured to be positioned in a set of different physical configurations is described. The apparatus may include means for transmitting a signal from a first antenna element, generating an echo signature of the signal based on detecting an echo of the signal at a second antenna element that differs from the first antenna element, and determining that the UE is in a first physical configuration of the set of different physical configurations based on comparing the echo signature to a set of different echo signatures.

A non-transitory computer-readable medium storing code for wireless communication at a UE that is configured to be positioned in a set of different physical configurations is described. The code may include instructions executable by a processor to transmit a signal from a first antenna element, generate an echo signature of the signal based on detecting an echo of the signal at a second antenna element that differs from the first antenna element, and determine that the UE is in a first physical configuration of the set of different physical configurations based on comparing the echo signature to a set of different echo signatures.

In some examples of the method, apparatuses, and non-transitory computer-readable medium described herein, generating the echo signature of the signal further may include operations, features, means, or instructions for generating the echo signature of the signal based on detecting a set of echoes of the signal at a set of antenna elements that differ from the first antenna element.

In some examples of the method, apparatuses, and non-transitory computer-readable medium described herein, generating the echo signature of the signal further may include operations, features, means, or instructions for generating the echo signature of the signal based on mitigating MC between the first antenna element and the second antenna element.

In some examples of the method, apparatuses, and non-transitory computer-readable medium described herein, generating the echo signature of the signal further may include operations, features, means, or instructions for determining an amount of delay between transmission of the signal from a first antenna element and detection of the echo of the signal at the second antenna element.

In some examples of the method, apparatuses, and non-transitory computer-readable medium described herein, the echo signature indicates a received power of the echo of the signal, a delay between transmission of the signal from a first antenna element and detection of the echo of the signal at the second antenna element, a delay spread of the signal, an angular spread of the signal, a power spectrum of the signal, or any combination thereof.

Some examples of the method, apparatuses, and non-transitory computer-readable medium described herein may further include operations, features, means, or instructions for performing an operating system function corresponding to the first physical configuration based on the determining that the UE may be in the first physical configuration.

In some examples of the method, apparatuses, and non-transitory computer-readable medium described herein, performing the operating system function further may include operations, features, means, or instructions for controlling a display functionality of the UE based on the first physical configuration, where the display functionality includes an on-off setting of the UE, a brightness setting, one or more display menu options, a display background image, or a combination thereof.

In some examples of the method, apparatuses, and non-transitory computer-readable medium described herein, performing the operating system function further may include operations, features, means, or instructions for switching off a subsystem (e.g., a display) of the UE based on the first physical configuration being a closed physical configuration.

In some examples of the method, apparatuses, and non-transitory computer-readable medium described herein, performing the operating system function further may include operations, features, means, or instructions for switching on a subsystem (e.g., a display) of the UE based on the first physical configuration being a partially open or an open physical configuration.

Some examples of the method, apparatuses, and non-transitory computer-readable medium described herein may further include operations, features, means, or instructions for calibrating the set of different echo signatures based on determining that that the UE includes a case.

In some examples of the method, apparatuses, and non-transitory computer-readable medium described herein, calibrating the set of different echo signatures further may include operations, features, means, or instructions for prompting a user to place the UE in one or more of the set of different physical configurations, transmitting a second wireless signal via the first antenna element when in each of the one or more of the set of different physical configurations based on the prompting, and adjusting one or more of the set of different echo signatures based on measurements of the second wireless signal when in each of the one or more of the set of different physical configurations.

In some examples of the method, apparatuses, and non-transitory computer-readable medium described herein, the generating the echo signature of the signal further may include operations, features, means, or instructions for identifying at least one antenna element being used by an exposure sensor for exposure sensing and cancelling MC from the echo signature corresponding to the exposure sensing.

In some examples of the method, apparatuses, and non-transitory computer-readable medium described herein, detecting that the UE may be in a first physical configuration further may include operations, features, means, or instructions for receiving a reflector indication from an exposure sensor performing exposure sensing indicating presence or absence of a reflector near the first antenna element, the second antenna element, or both, where the detecting may be based on the reflector indication.

In some examples of the method, apparatuses, and non-transitory computer-readable medium described herein, an antenna panel of the UE may include the first antenna element and the second antenna element.

In some examples of the method, apparatuses, and non-transitory computer-readable medium described herein, a first antenna panel of the UE may include the first antenna element, and a second antenna panel of the UE may include the second antenna element.

In some examples of the method, apparatuses, and non-transitory computer-readable medium described herein, the first physical configuration may correspond to the UE being in an opened physical configuration.

In some examples of the method, apparatuses, and non-transitory computer-readable medium described herein, the first physical configuration may correspond to the UE being in a partially opened physical configuration.

In some examples of the method, apparatuses, and non-transitory computer-readable medium described herein, the first physical configuration may correspond to the UE being in a closed physical configuration.

Some examples of the method, apparatuses, and non-transitory computer-readable medium described herein may further include operations, features, means, or instructions for detecting that the UE is in the first physical configuration is determined by a modem sensor of the UE.

DETAILED DESCRIPTION

Figure 1:
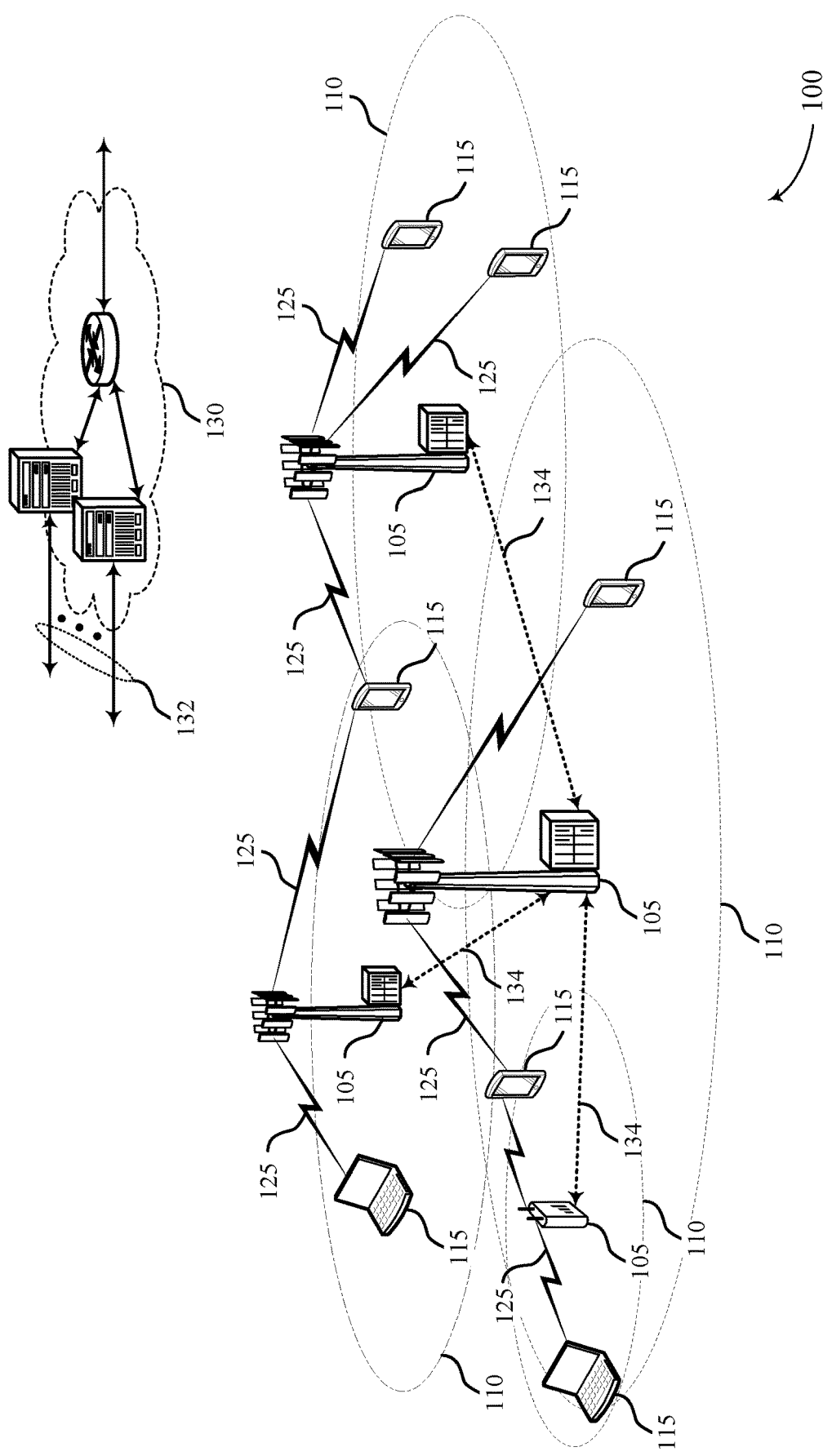
FIG. 1 illustrates an example of a system for wireless communications in accordance with aspects of the present disclosure.

A wireless device, such as a user equipment (UE), may include different physical configurations (e.g., different relative orientations of parts) based on variable form factors available to the UE. For example, the UE may include multiple foldable display units, flexible displays, bendable displays, rollable displays, or other unique form factors. Based on the different available form factors, various operating system functions (e.g., various UE subsystem operations) may depend on a current physical configuration of the UE. In some cases, the UE may determine the current physical configuration of its form factor (e.g., open, partially opened, closed, etc.) based on physical (e.g., mechanical) switches inside the UE. However, including the physical switches within the UE may occupy a large amount of space that could be used for other parts, sensors, chips, etc. Accordingly, the techniques described herein may be used to eliminate mechanical switches or mechanical sensors, and instead, the UE may determine the current physical configuration of its form factor (e.g., open, partially opened, closed, etc.) based on modem-based sensors within the UE. For example, the UE may include a maximum permissible exposure (MPE) sensor, which may be a radar-based sensor that the UE can use to transmit a waveform from one antenna element and listen for an echo at a second antenna element that reflects off of a reflector (e.g., finger of a user, wall, etc.).

In some wireless communications systems (e.g., millimeter wave (mmW) communications), a UE may be required to detect nearby human presence to determine if it is at risk of violating a radio frequency (RF) maximum exposure limit (e.g., a regulatory-defined requirement) and reduce its power accordingly. The MPE sensor may be used to detect the nearby human presence according to MPE rules (e.g., a detect MPE condition) by using its radar-based sensor to receive an echo of a waveform transmission that indicates the proximity of the nearby human presence. For example, based on characteristics of the received echo (e.g., elapsed time since the waveform transmission, received signal power of the echo, etc.), the UE may determine how far away any nearby objects (e.g., humans) are and may adjust its power if the nearby objects are too close. Accordingly, the UE may use this MPE sensor to determine a distance between two antenna elements placed on different parts of the UE. By transmitting the waveform from one antenna element and receiving an echo of the waveform at a different antenna element (e.g., a second antenna element), the UE may determine a relative location of the different antenna element based on the first antenna element (e.g., more or less separated), which may indicate a physical configuration of the UE (e.g., open, partially open, or closed). Based on this physical configuration, the UE may perform one or more operating system functions (e.g., control a display functionality of the UE, turn on a display, turn off a display, turn on or off a UE subsystem, etc.).

To determine a more accurate reading of the echo received at the different antenna element, the UE may cancel a mutual coupling (MC) from the first antenna waveform transmission at an additional antenna element. For example, the MC may represent a stronger direct reception of the waveform transmission from the first antenna element to the additional antenna element, which may drown out the echo received at the additional antenna element. Accordingly, by measuring different characteristics of the received echo (e.g., a time delay between the transmitting the waveform from the first antenna element and receiving the echo at the additional antenna element) and the attenuation of the MC, the UE may estimate the current physical configuration (e.g., current form factor). In some cases, the UE may determine and estimate the current physical configuration based on comparing the different measured characteristics against calibrated values for the characteristics and MC attenuation. These calibrated values may be programmed into the UE, calculated periodically, or a combination thereof. Additionally, the UE may use additional form factor sensors in conjunction with the MPE sensor or apart from the MPE sensor to determine its current physical configuration.

Particular aspects of the subject matter described herein may be implemented to realize one or more advantages. The described techniques may support improvements in system efficiency such that a device may increase power savings by turning a screen of the device off when the device is in a closed position. The described techniques may also promote enhanced capabilities of the device by enabling the device to use existing modem-based sensors, which may result in increased space for additional components of the device. As such, supported techniques may include improved device operations and, in some examples, may promote device and network efficiencies, among other benefits.

Aspects of the disclosure are initially described in the context of a wireless communications system. An additional wireless communications system, examples of different physical configurations of a UE, and a sensor configuration are then provided to illustrate aspects of the disclosure. Aspects of the disclosure are further illustrated by and described with reference to apparatus diagrams, system diagrams, and flowcharts that relate to a modem-based form factor sensor.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via a number of different antenna subarrays, by processing received signals according to a number of different antenna subarrays, by receiving according to a number of different receive beamforming weight sets applied to signals received at a plurality of antenna elements of an antenna array, or by processing received signals according to a number of different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may have multiple antenna arrays for wireless communication between the UE 115 and other wireless devices (e.g., a base station 105). Additionally, the UE 115 may include a flexible display with multiple foldable states (e.g., different physical configurations). For example, the multiple foldable states may include flexible, bendable, or rollable displays that can result in the UE 115 being used for different functions (e.g., a mobile device, a phone, a tablet, a watch, or other devices with different form factors). These flexible UEs 115 may include various operating system functions that depend on a current physical configuration or relative orientation of parts of the UE 115. For example, the UE 115 may be a laptop or a foldable phone, and a current physical configuration of the UE 115 may indicate whether the laptop or foldable phone is open or closed. Accordingly, depending on whether or not the UE 115 is open or closed may determine whether or not to switch its screen on or off.

To determine the current physical configuration, the UE 115 may use dedicated sensors in different moving parts of the UE 115. For example, the dedicated sensors may include mechanical switches, mechanical sensors, gyroscopes, accelerometers, compasses, etc. However, these different sensors and switches may not give precise results to indicate accurate physical configurations of the UE 115. Additionally or alternatively, new sensors may be introduced into the UE 115 to indicate and determine a corresponding physical configuration of the UE 115. However, space may be limited within the UE 115 based on the existing sensors described above, so introducing new sensors may be unreasonable or implausible to implement. Accordingly, different sensors or techniques may be desired for determining a current physical configuration of the UE 115.

In some wireless communications systems (e.g., mmW communications), a UE 115 may be required to detect nearby human presence to determine if the UE 115 is at risk of violating an RF maximum exposure limit (e.g., a regulatory-defined requirement) and reduce its power accordingly. An MPE sensor connected to a modem within the UE 115 may be used to detect the nearby human presence according to MPE rules (e.g., a detect MPE condition) by using its radar-based sensor to receive an echo of a waveform transmission that indicates the proximity of the nearby human presence. For example, based on characteristics of the received echo (e.g., elapsed time since the waveform transmission, received signal power of the echo, etc.), the UE may determine how far away any nearby objects (e.g., humans) are and may adjust its power if the nearby objects are too close.

Wireless communications system 100 may support efficient techniques of a UE 115 reusing an existing RF transmission/reception functionality of an MPE sensor with a modem (e.g., a modem-based sensor) to detect its current physical configuration. For example, the UE 115 may use this MPE sensor to determine a distance between two antenna elements placed on different parts of the UE 115. By transmitting a waveform from one antenna element and receiving an echo of the waveform at a different antenna element (e.g., a second antenna element), the UE 115 may determine a relative location of the different antenna element based on the first antenna element (e.g., more or less separated), which may indicate a physical configuration of the UE 115. In some cases, the first and second antenna elements may each be singly or doubly polarized, or in some cases, they may both be the same doubly polarized element, with transmission on one polarization and reception on the other polarization. Based on this physical configuration, the UE 115 may perform one or more operating system functions (e.g., control a display functionality of the UE 115, turn on a display, turn off a display, turn on or off a UE subsystem, etc.)

Figure 2:
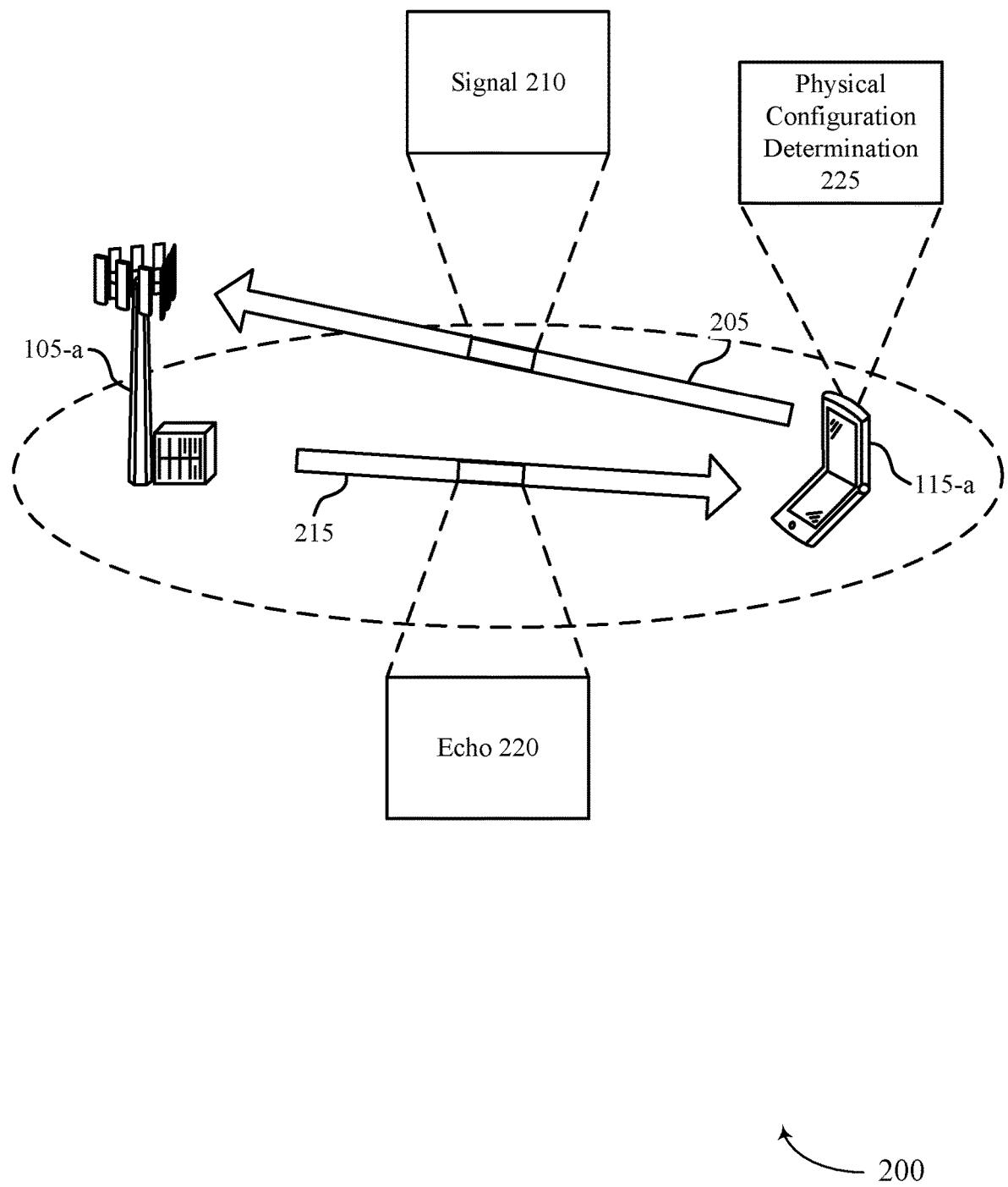
FIG. 2 illustrates an example of a wireless communications system in accordance with aspects of the present disclosure.

FIG. 2 illustrates an example of a wireless communications system 200 in accordance with aspects of the present disclosure. In some examples, wireless communications system 200 may implement aspects of wireless communications system 100. Wireless communications system 200 may include a UE 115-*a* and a base station 105-*a*, which may be examples of corresponding UEs 115 and base stations 105, respectively, as described above with reference to FIG. 1. As described herein, UE 115-*a* may be an example of a foldable or flexible UE 115 that includes various form factors or physical configurations. Based on a current physical configuration of UE 115-*a*, different operating system functions may be performed. As such, UE 115-*a* may determine its current physical configuration in order to perform one or more appropriate operating system functions.

As described above, UE 115-*a* may include an MPE sensor to detect nearby human presence to determine if the UE 115 is at risk of violating an RF exposure limit and reduce power accordingly. The MPE sensor may detect any nearby humans or other objects (e.g., a user's hand that is operating UE 115-*a*) through a radar-based approach of transmitting a waveform and receiving an echo of the waveform that bounces off the nearby human or object to identify the distance to the human or object. UE 115-*a* may use the MPE sensor in a similar manner to determine its current physical configuration by transmitting the waveform from one antenna element and receiving the echo of the waveform at a second antenna element. UE 115-*a* may measure characteristics about the echo to determine how far apart the two antenna elements are, which may indicate the current physical configuration. For example, UE 115-*a* may measure how long it takes for the second antenna element to receive the echo and determine the current physical configuration based on this delay.

As shown, UE 115-*a* may send an uplink transmission 205 that includes a signal 210, where the signal 210 further includes the waveform from the MPE sensor. Part of the signal 210 may reflect off an object between UE 115-*a* and base station 105-*a*, off of base station 105-*a*, or some other object and create an echo 220 that UE 115-*a* receives as a downlink transmission 215 (to the perspective of UE 115-*a*). Additionally, UE 115-*a* may transmit the signal 210 from one antenna element and receive the echo 220 at a second antenna element. UE 115-*a* may then perform a physical configuration determination 225 based on receiving the echo 220 at the second antenna element. The two antenna elements may be located on a same antenna panel or on nearby antenna panels. As such, a low power waveform for the signal 210 may enable UE 115-*a* to determine its current physical configuration. Additionally, the low power waveform may not interfere with other nearby receivers (e.g., base station 105-*a* receiving transmissions from other UEs 115 in an uplink slot, neighboring UEs 115 receiving downlink transmissions if a downlink slot is used, etc.).

In order to obtain an accurate reading and measurement for the echo 220, the MPE sensor within UE 115-*a* may cancel a MC between the pair of the first antenna element and the second antenna element. The MC may indicate a stronger, direct reception of the signal 210 from the first antenna element to the second antenna element. If the MPE sensor and UE 115-*a* do not cancel the MC, the MC may drown out the echo 220, skewing any measurements and compromising the physical configuration determination 225. For example, UE 115-*a* may determine that the two antenna elements are closer together or farther apart based on not canceling the MC. In some cases (e.g., with the variable form factors for UE 115-*a*), two antenna panels (or antenna elements) may be nearby in a first physical configuration and may be more separated in a second physical configuration. For example, if UE 115-*a* represents a folding phone, two antenna panels along the edges of UE 115-*a* may be separated when the phone is open and may come next to each other when the phone closes. As such, the measurements of the echo 220 (e.g., a time delay) and the attenuation of the MC may be used to estimate a current form factor and perform the physical configuration determination 225.

In some cases, UE 115-*a* may perform the physical configuration determination 225 based on comparing measurements of the echo 220 and calibrated values for the different form factors and physical configurations of UE 115-*a*. Accordingly, the physical configuration determination 225 may include an association of a delay and an MC attenuation between the calibration values and the measured values. The calibration values may be calculated and configured for UE 115-*a* when UE 115-*a* is manufactured (e.g., at a factory). These calibration values may be calculated for different pairs of transmit/receive antenna elements or antenna panels. Additionally, the calibration values may be calculated based on calibration signals sent from the transmit antenna elements and received by the receive antenna elements. These calibration signals may be beamformed transmissions (e.g., transmission and/or reception beamforming) that may be sent at multiple power levels.

A signature (e.g., how the echo 220 may look) received from multiple receive antenna elements for each transmit antenna element or a group of transmit antenna elements may be stored as a function of a form factor. For example, different signatures may indicate corresponding form factors of UE 115-*a*. Additionally, the different signatures may include a received power, a delay, a delay-spread, an angular spread, a power spectrum, etc., that are specific to the corresponding form factor. In some cases, the signature may indicate a received power is zero or below a threshold (e.g., the received echo 220 is too weak) or is a maximum value (e.g., the received echo 220 is too strong or above a threshold, which may indicate a receiver low-noise amplifier at UE 115-*a* is saturated).

In some cases, UE 115-*a* may periodically re-calibrate its calibration values and signatures for each of the different form factors and physical configurations while in operation (e.g., on the fly). For example, different add-ons (e.g., phone cases) may change the signature for the corresponding form factors, and the periodic re-calibrations may account for these different add-ons. In some cases, to determine the appropriate form factors for UE 115-*a* with the add-ons (e.g., a true form factor), other means and/or other sensors (e.g., mechanical sensors, gyroscopes, accelerometers, compasses, etc.) may be used. Additionally or alternatively, the MPE sensor may run periodically as a default, enabling the periodic re-calibrations, and duty-cycles on the other sensors may be disabled or reduced to save power. In other schemes, UE 115-*a* may detect the add-ons (e.g., through additional sensors or means) and prompt an operator (e.g., user) of UE 115-*a* for user-assistance in the re-calibration. For example, UE 115-*a* may ask the operator to place UE 115-*a* in a set of defined form factor configurations to re-calibrate and calculate signatures for each of the form factors. This calibration and/or re-calibrations may be used for functionality of the MPE sensor. For example, the MPE sensor may use the calibrations to determine which antenna elements (or antenna panels) to use for MPE sensing and how to cancel the resulting MC between the antenna elements.

Additionally or alternatively, UE 115-*a* may use a different form factor sensor in addition to the MPE sensor or separate from the MPE sensor to perform the physical configuration determination 225. For example, the MPE sensor may include different requirements for its measurements other than determining a form factor of UE 115-*a*. In some cases, the MPE sensor may use a separate transmit chain with a different signal bandwidth that does not measure a group delay for an RF chain used for positioning transmissions (e.g., positioning reference signals (PRSs), round-trip time (RTT) signals, etc.). Additionally or alternatively, the MPE sensor may use a self-beating operation with frequency-modulated continuous-wave (FMCW) radar that can introduce new MC modes that are not present during transmit and receive operations.

Accordingly, a form factor sensor may be used to determine the current form factor and physical configuration by using a different transmit/receive chain than the MPE sensor. For example, a different transmit/receive chain may be used to measure the group-delay between digital samples and the antenna elements, which may be used in certain positioning techniques such as RTT or observed time-difference of arrival (OTDOA), and this measurement may be re-used to also detect a physical configuration of the form factor for UE 115-*a*. The duty cycles (e.g., periods when the sensors are active) of the two sensors may be related, enabling the two sensors to exchange information. For example, the MPE sensor may use a larger bandwidth to detect nearby reflectors (e.g., that reflect the echo 220) with higher accuracy. These reflectors may contribute to multipath interference during transmission and reception of signals for the form factor sensor but may be harder to identify by the form factor sensor (e.g., due to a lower bandwidth resolution of the form factor sensor). Thus, a presence or absence of a nearby reflector may be indicated from the MPE sensor to the form factor sensor. Additionally or alternatively, the form factor sensor may indicate a detected form factor (or physical configuration) to the MPE sensor, and the MPE sensor may decide which antenna panels to use for the subsequent physical configuration determinations based on the detected form factor from the form factor sensor. The same concepts may also apply to interaction between form factor sensors and group-delay measurement units. It is to be noted that multiple sensors (e.g., form-factor sensors, MPE sensors, group-delay measurement units, etc.) may share certain physical components (e.g., they may share antenna elements or antenna panels, voltage control oscillators (VCOs), or other units in an RF chain).

Figure 3A:
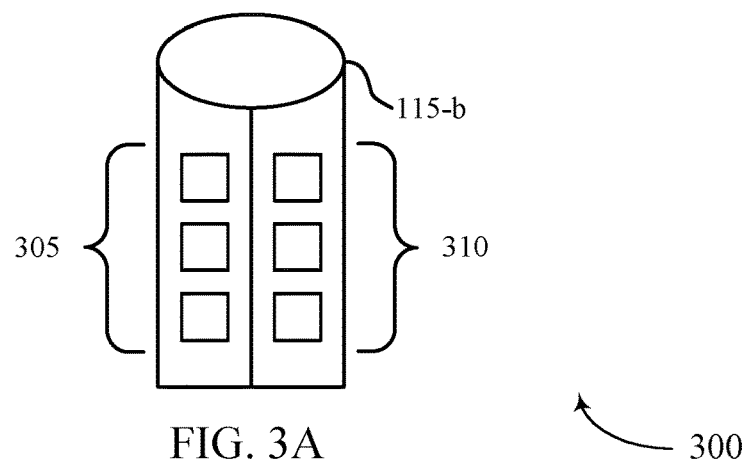
FIGS. 3A, 3B, and 3C illustrate examples of different physical configurations of a user equipment (UE) in accordance with aspects of the present disclosure.
Figure 3B:
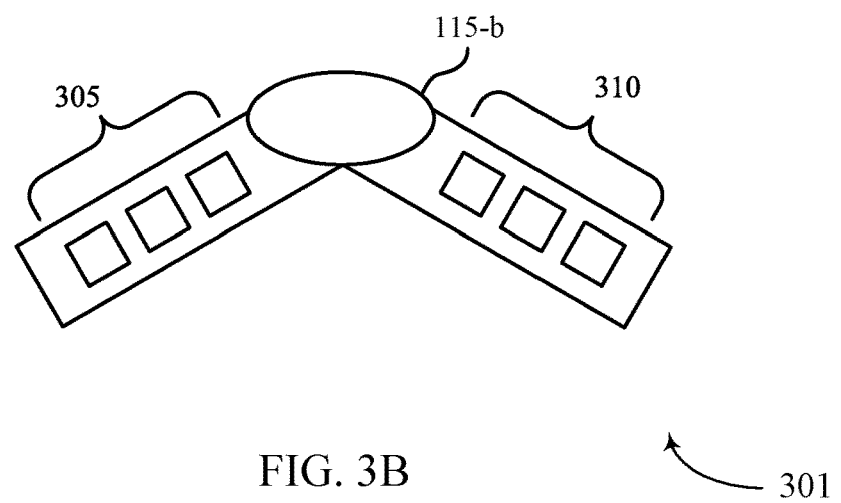
Figure 3C:
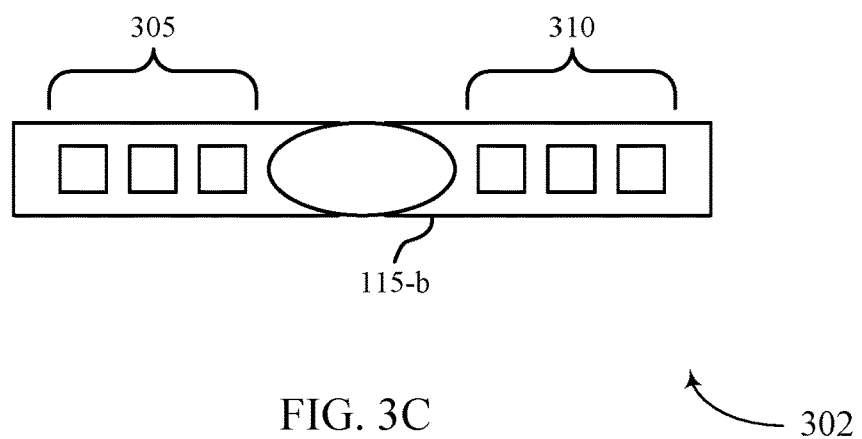

FIGS. 3A, 3B, and 3C illustrate examples of physical configurations 300, 301, and 302 of a UE 115-*b* in accordance with aspects of the present disclosure. In some examples, physical configurations 300, 301, and 302 may implement aspects of wireless communications systems 100 and/or 200. UE 115-*b*, as shown in the different physical configurations 300, 301, and 302, may be an example of a UE 115 as described above with reference to FIGS. 1 and 2. Additionally, as described herein, UE 115-*b* may be an example of a foldable or flexible UE 115 that includes various form factors or physical configurations, where a first antenna array 305 is located on a first section of UE 115-*b* and a second antenna array 310 is located on a second section of UE 115-*b*. Accordingly, UE 115-*b* may determine its current physical configuration based on identified or determined positions of the first antenna array 305 and the second antenna array 310 in order to perform corresponding operating system functions (e.g., control a display functionality of UE 115-*b*, turn on or off a UE subsystem of UE 115-*b*, etc.).

Physical configuration 300 may illustrate a first physical configuration for UE 115-*b*, where UE 115-*b* is closed. Accordingly, the first antenna array 305 is close to the second antenna array 310. As described above with reference to FIG. 2, UE 115-*b* may perform a physical configuration determination to identify its current physical configuration (e.g., physical configuration 300). For example, an MPE sensor within UE 115-b may transmit a signal (e.g., a waveform) from the first antenna array 305 and receive an echo of the waveform at the second antenna array 310. The MPE sensor may determine a signature of the echo (e.g., received power, a delay, a delay-spread, an angular spread, a power spectrum, etc.) and compare the signature against defined signatures calibrated for UE 115-b that correspond to different form factors of UE 115-b. UE 115-b may then determine which is its current form factor based on which defined signature (e.g., calibration value) is closest to the signature of the received echo. As such, UE 115-b may determine its current physical configuration is physical configuration 300.

Additionally, to accurately determine the signature of the received echo, UE 115-b (or the MPE sensor) may determine an MC between the first antenna array 305 and the second antenna array 310 and cancel the MC from the signature of the received echo. In some cases, the MC may be based on the distance between the first antenna array 305 and the second antenna array 310. For example, when the two antenna arrays are closer together, the second antenna array 310 may receive a higher direct signal from the first antenna array 305 when the first antenna array 305 transmits the waveform signal. As such, UE 115-b may determine the MC for the transmit/receive antenna pair of the first antenna array 305 and the second antenna array 310 and subtract the MC out of the waveform UE 115-b receives (e.g., at the second antenna array 310) that includes both the direct waveform signal reception and the received echo in order to determine a signature for the received echo alone.

In a similar manner, UE 115-b may determine its current physical configuration is physical configuration 301 or 302 based on transmitting the waveform from the first antenna array 305, receiving the echo of the waveform at the second antenna array 310 (with canceling the MC), and comparing a signature of the received echo versus calibrated signatures of defined form factors of UE 115-b. In some cases, physical configurations 300, 301, and 302 may illustrate examples of defined form factors for UE 115-b. Accordingly, UE 115-b may determine which operating system functions to perform based on being in one of physical configurations 300, 301, or 302. For example, UE 115-b may determine it is closed based on being in physical configuration 300 and may power off its screen based on this determination. Alternatively, UE 115-b may determine it is partially open based on being in physical configuration 301 or fully open based on being in physical configuration 302 and may power on its screen based on one of these determinations. UE 115-b may more generally control a display functionality (e.g., an on-off setting of UE 115-b, a brightness setting, one or more display menu options, a display background image, etc.) or switch on or off a subsystem of UE 115-b (e.g., turn on or off its display, a camera, a microphone, sensors, etc.) based on its current physical configuration.

Additionally or alternatively, UE 115-b may determine it is in an intermediate position somewhere between the illustrated examples of the physical configurations and may perform an appropriate operating system function based on which physical configuration it is closest to. For example, UE 115-b may determine its current physical configuration is in between physical configuration 300 and physical configuration 301, but closer to physical configuration 300 (e.g., more closed). As such, UE 115-b may power off its screen even though it is not fully closed based on its current physical configuration being closer to physical configuration 300.

As described in FIG. 2, the first antenna array 305 and the second antenna array 310 may be on nearby antenna panels, such that a low power waveform for the transmission/reception for the physical configuration determination does not interfere with other receivers. Additionally or alternatively, the first antenna array 305 and the second antenna array 310 may be part of the same antenna panel that spans across both sections of UE 115-b, where the same antenna panel is used for the transmission and reception of the waveform. For example, one or more antenna element of the first antenna array 305 of the antenna panel may transmit the waveform, and one or more antenna element on the second antenna array 310 of the antenna panel may receive the echo of the waveform to determine the physical configuration of UE 115-b. Additionally or alternatively, UE 115-b may transmit the waveform from each antenna element in the first antenna array 305, attempt to receive the echo of the waveform at each antenna element in the second antenna array 310 to determine the signature of the echo, and, accordingly, determine the physical configuration of UE 115-b.

Figure 4:
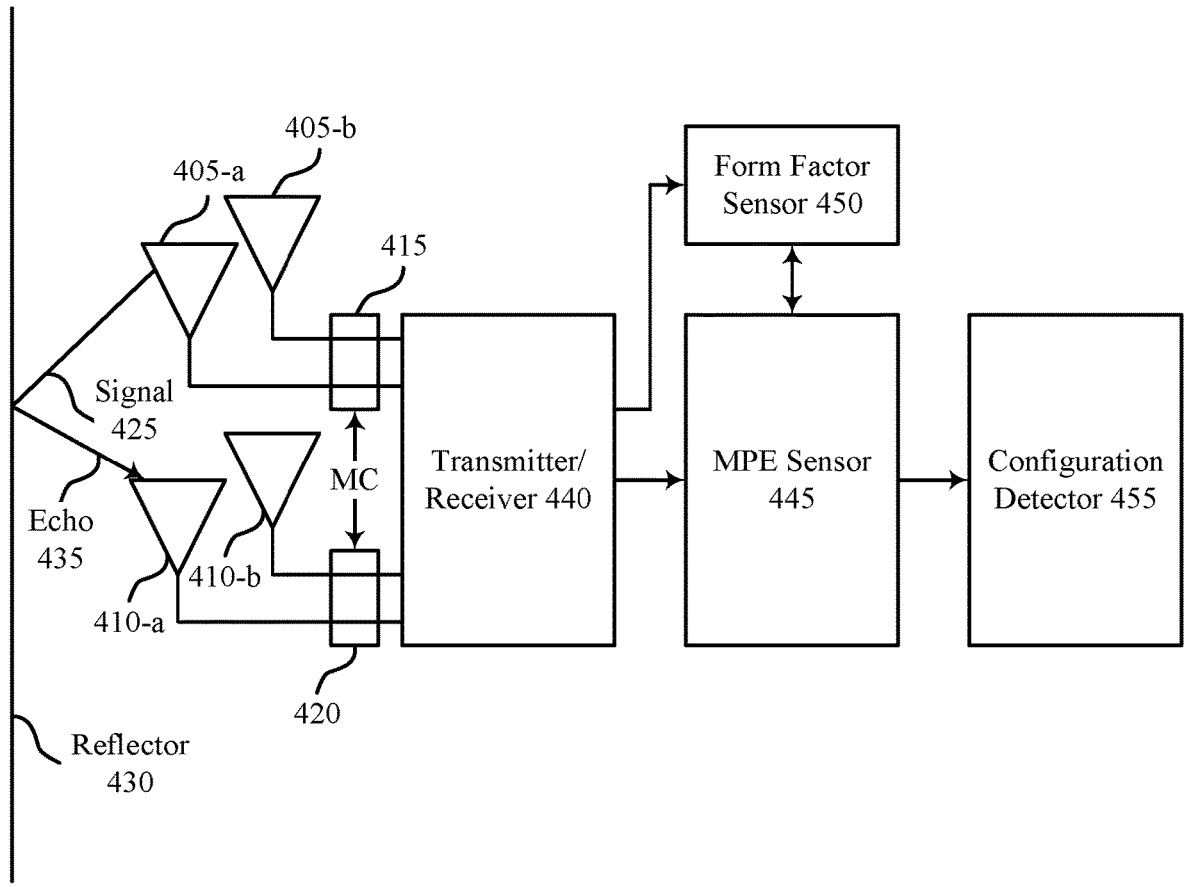
FIG. 4 illustrates an example of a sensor configuration in accordance with aspects of the present disclosure.
Figure 5A:
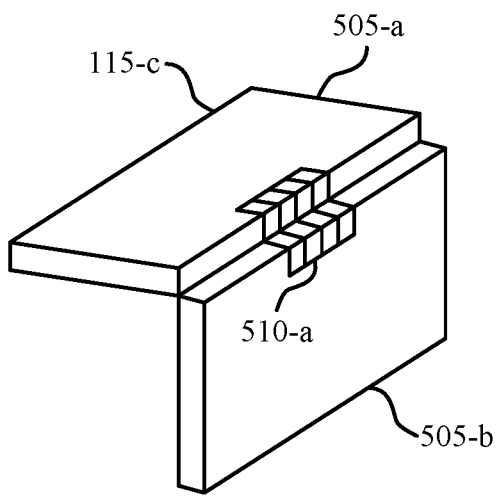
FIGS. 5A, 5B, 5C, and 5D illustrate examples of foldable configurations of a UE in accordance with aspects of the present disclosure.
Figure 5B:
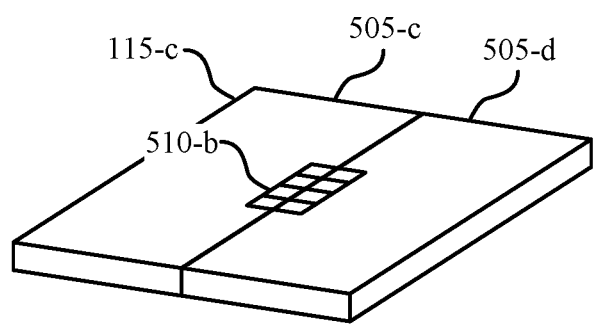
Figure 5C:
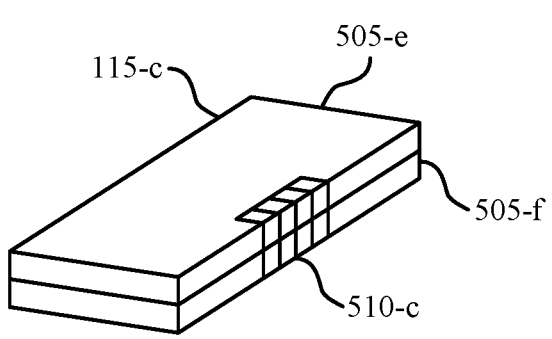
Figure 5D:
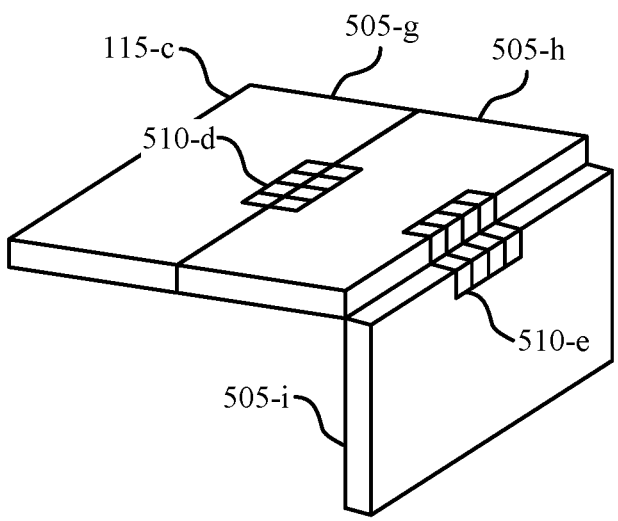

FIG. 4 illustrates an example of a sensor configuration 400 in accordance with aspects of the present disclosure. In some examples, sensor configuration 400 may implement aspects of wireless communications systems 100 and/or 200. Sensor configuration 400 may be used by a UE 115, where the UE 115 is capable of folding or being adjusted into different form factors and physical configurations. Based on the different possible form factors, different operating system functions may be performed, such that the UE 115 may determine its current form factor (or physical configuration) in order to determine which operating system functions to perform. To determine its current form factor, the UE 115 may include sensor configuration 400.

Sensor configuration 400 may include one or more first antenna elements 405 and one or more second antenna elements 410. In some cases, the first antenna elements 405 may be located on a first antenna panel 415, and the second antenna elements 410 may be located on a second antenna panel 420. Additionally or alternatively, the first antenna elements 405 and the second antenna elements 410 may be located on a same antenna panel. The UE 115 may transmit a signal 425 from the one or more first antenna elements 405. The signal 425 may reflect off a reflector 430 to produce an echo 435. In some cases, a transmitter/receiver 440 may perform the transmission of the signal 425 and reception of the echo 435 at the corresponding antenna elements of the UE 115.

The UE 115 may then generate an echo signature of the signal 425 based on detecting the echo 435 at the one or more second antenna elements 410 (e.g., different from the one or more first antenna elements 405). In some cases, an MPE sensor 445 (e.g., a modem sensor) may perform the generation of the echo signature. The UE 115 may generate the echo signature of the signal 425 based on mitigating MC between the one or more first antenna elements 405 of the first antenna panel 415 and the one or more second antenna elements 410 of the second antenna panel 420. The UE 115 may identify at least one antenna element being used by an exposure sensor (e.g., MPE sensor 445) for exposure sensing (e.g., an RF exposure) and may cancel the MC from the echo signature corresponding to the exposure sensing. In some cases, the UE 115 may generate the echo signature of the signal 425 based on detecting one or more echoes of the signal 425 at multiple antenna elements of the second antenna panel 420 (e.g., second antenna elements 410-a and 410-b).

The echo signature may include a received power of the echo 435 of the signal 425, a delay between transmission of the signal 425 from the one or more first antenna elements 405 and detection of the echo 435 at the one or more second antenna elements 410, a delay spread of the signal 425, an angular spread of the signal 425, a power spectrum of the signal 425, or any combination thereof. Accordingly, the UE 115 may determine the amount of delay between transmission of the signal 425 and receiving (e.g., detection) the echo 435 as part of the echo signature.

The UE 115 (e.g., MPE sensor 445, a modem sensor, configuration detector 455, etc.) may then determine that it is in a first physical configuration of the different possible physical configurations based on comparing the generated echo signature to a set of different echo signatures. In some cases, the different possible configurations may include an opened physical configuration, a partially opened physical configuration, a closed physical configuration, or a bent physical configuration (e.g., for the case of bendable phones).

Additionally or alternatively, the UE 115 may include a form factor sensor 450 (e.g., modem sensor) that determines the first physical configuration in conjunction with the MPE sensor 445. For example, the form factor sensor 450 may use a different transmit/receive chain than the MPE sensor 445, but both sensors may have related duty cycles and exchange information back and forth about the physical configuration. In some cases, the UE 115 may receive a reflector indication from MPE sensor 445 indicating a presence or absence of a reflector 430 near the one or more first antenna elements 405, the one or more second antenna elements 410, or both. The MPE sensor 445 may indicate this presence or absence to the form factor sensor 450 to determine the physical configuration of the UE 115. Additionally or alternatively, the form factor sensor 450 may indicate a detected form factor (e.g., based on the reflector indication) to the MPE sensor 445, and the MPE sensor may determine which antenna panels are to be used for the physical configuration determination (e.g., antenna panels 415 and 420).

The UE 115 may identify the different echo signatures based on different calibration echo signatures stored in the UE 115. In some cases, the UE 115 may include an add-on (e.g., a case, an attached external camera, credit-card reader, or the like) and may calibrate the set of different echo signatures based on having the add-on. For example, the UE 115 may prompt a user to place the UE 115 in one or more of a set of different physical configurations that correspond to one or more of the different calibration echo signatures stored in the UE 115. The UE 115 (e.g., transmitter/receiver 440) may then transmit a second wireless signal via the one or more first antenna elements 405 when in each of the one or more of the set of different physical configurations based on the prompting. In some cases, the UE may adjust one or more of the set of different echo signatures based on measurements of the second wireless signal (e.g., a the one or more second antenna elements 410) when in each of the prompted one or more of the set of different physical configurations.

The UE 115 may then perform an operating system function corresponding to the first physical configuration based on the determining that the UE 115 is in the first physical configuration (e.g., through configuration detector 455). In some cases, the UE 115 may control a display functionality of the UE 115 based on the first physical configuration, where the display functionality includes an on-off setting of the UE 115, a brightness setting, one or more display menu options, a display background image, or a combination thereof. For example, the UE 115 may switch off a subsystem (e.g., its display, a camera, a microphone, sensors, etc.) based on the first physical configuration being a closed physical configuration. Alternatively, the UE 115 may switch on a subsystem (e.g., its display, a camera, a microphone, sensors, etc.) based on the first physical configuration being a partially open or an open physical configuration.

FIGS. 5A, 5B, 5C, and 5D illustrate examples of foldable configurations 500, 501, 502, and 503 in accordance with aspects of the present disclosure. In some examples, foldable configurations 500 may implement aspects of wireless communications systems 100 and/or 200. Foldable configurations 500, 501, 502, and 503 may include examples of different foldable states with one or more foldable units 505 for a UE 115-c. Each foldable state may further include one or more antenna arrays 510 that include multiple antenna elements. As described herein, UE 115-c may determine its current physical configuration (e.g., foldable configuration, form factor, etc.) by transmitting a signal from one antenna element and receiving an echo of the signal at a different antenna element.

Accordingly, UE 115-c may switch on a display for one or more of the foldable units 505 for each foldable configuration based on its current physical configuration. For example, for foldable configuration 500, UE 115-c may switch on displays on one or both of the foldable units 505 based on whether foldable unit 505-b is being opened or closed. The display for foldable unit 505-a may be turned on, and if it is determined that the current physical configuration for UE 115-c indicates that foldable unit 505-b is closer to foldable unit 505-a, the display for foldable unit 505-b may also be turned on. UE 115-c may determine this physical configuration based on transmitting a signal from one or more antenna elements in an antenna array 510 on the foldable unit 505-a and receiving the echo of the signal at one or more antenna elements in an antenna array 510 on the foldable unit 505-b. In some cases, the signal transmission and echo reception may be performed by a modem-based sensor (e.g., MPE sensor, form factor sensor, etc.) as described above.

For foldable configuration 501, UE 115-c may switch on displays for both a foldable unit 505-c and a foldable unit 505-d based on identifying its current physical configuration (e.g., through the modem-based sensor). Alternatively, for foldable configuration 502, UE 115-c may switch on a display for foldable unit 505-e and switch off a display for foldable unit 505-f based on the corresponding physical configuration (e.g., through the modem-based sensor).

In some cases, UE 115-c may include more than two (2) foldable units 505. For example, foldable configuration 503 may include a first foldable unit 505-g, a second foldable unit 505-h, and a third foldable unit 505-i. Accordingly, based on the shown physical configuration, UE 115-c may switch on displays of the first foldable unit 505-g and the second foldable unit 505-h. In some cases, UE 115-c may determine whether to switch on the display for the third foldable unit 505-i based on determining whether foldable unit 505-i is closing or opening. For example, if the current physical configuration (e.g., as determined through the modem-based sensor) indicates foldable configuration 503 is closer to a calibrated physical configuration where the display for the third foldable unit 505-i is off (e.g., foldable unit 505-i is closing), then UE 115-c may turn the display off. Alternatively, if the current physical configuration indicates foldable configuration 503 is closer to a calibrated physical configuration where the display for the third foldable unit 505-i is on (e.g., foldable unit 505-i is opening), then UE 115-c may turn the display on. Turning on or off of a display unit is only an example instance of an operation that may depend on the current physical configuration of a UE form factor. Other examples such as enabling of certain sensors as described earlier, or enabling of context-sensitive displays (where the displayed screens depend on the physical configuration) are other examples of operations that may depend on the current physical configuration of a UE form factor. Additionally, the operation of various UE subsystems, such as different built-in or add-on accessories (e.g., a camera, a microphone, other sensors, etc.), may depend on the current physical configuration of the UE form factor (e.g., operation of the different built-in or add-on accessories).

The different foldable configurations as shown in FIGS. 5A, 5B, 5C, and 5D and the physical configuration as shown in FIGS. 3A, 3B, and 3C may be examples of different physical configuration with which a UE 115 may be configured. A UE 115 may include additional physical configurations not described herein, where the UE 115 uses the modem-based sensor (e.g., MPE sensor, form factor sensor, etc.) to determine the corresponding current physical configuration and to perform the appropriate operating system functions.

Figure 6:
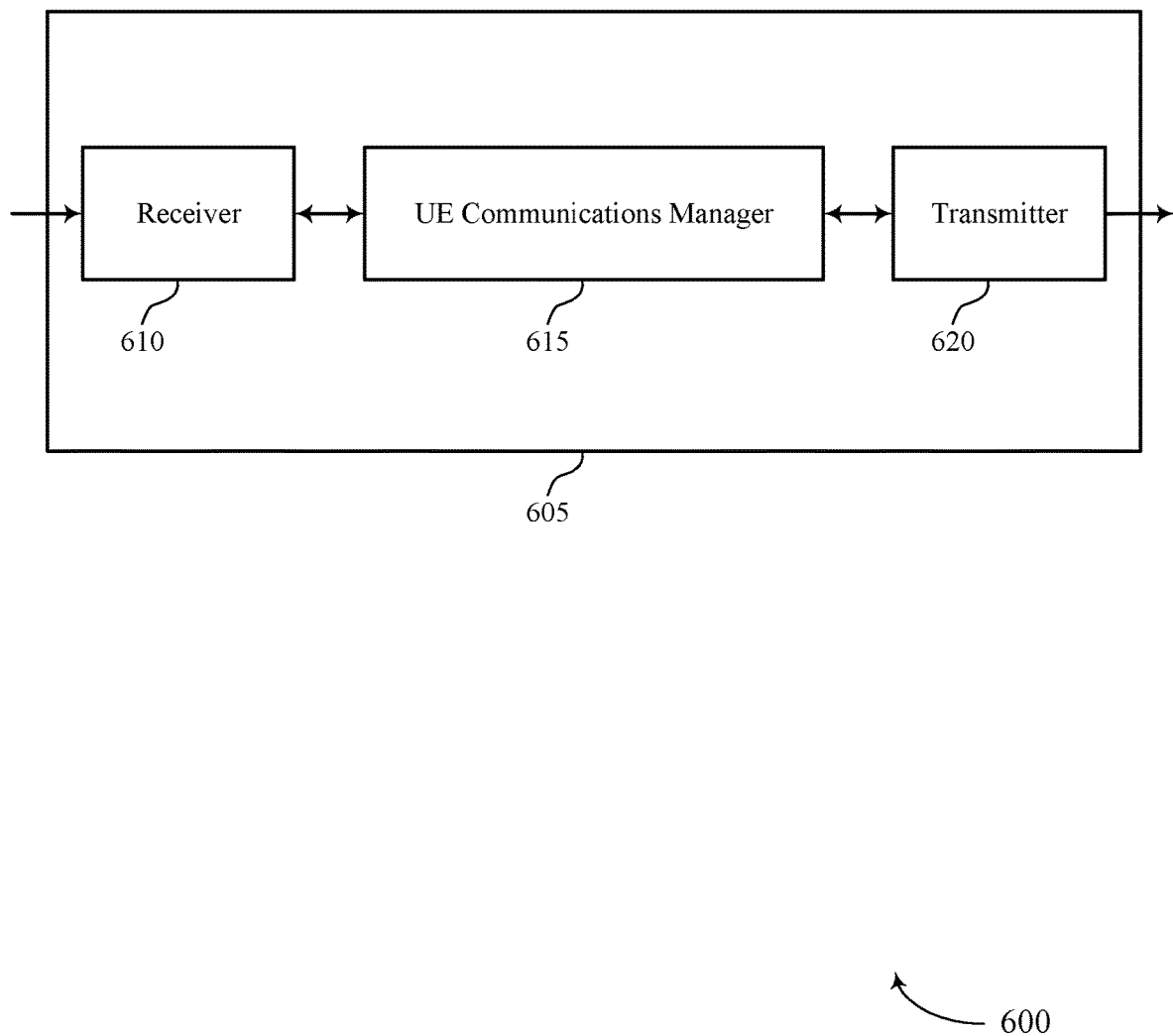
FIGS. 6 and 7 show block diagrams of devices in accordance with aspects of the present disclosure.

FIG. 6 shows a block diagram 600 of a device 605 in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to modem-based form factor sensor, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may transmit a signal from a first antenna element. Additionally, the UE communications manager 615 may generate an echo signature of the signal based on detecting an echo of the signal at a second antenna element that differs from the first antenna element. In some cases, the UE communications manager 615 may determine that the UE is in a first physical configuration of the set of different physical configurations based on comparing the echo signature to a set of different echo signatures. The UE communications manager 615 may be an example of aspects of the UE communications manager 910 described herein.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the UE communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The UE communications manager 615 as described herein may be implemented to realize one or more potential advantages. One implementation may allow the device 605 to perform operating system functions based on the physical configuration of the device 605. For example, when the device 605 determines it is in a closed position the device 605 may turn its screen off or terminate various other processing operations that may result in power savings and a reduction in processing complexities. Additionally, by using existing sensors within the device 605 (e.g., an MPE sensor) to determine the physical configuration of the device 605, space may be freed up within the device 605 for use with other sensors, modules, etc., to allow the device 605 to operate more efficiently.

Figure 7:
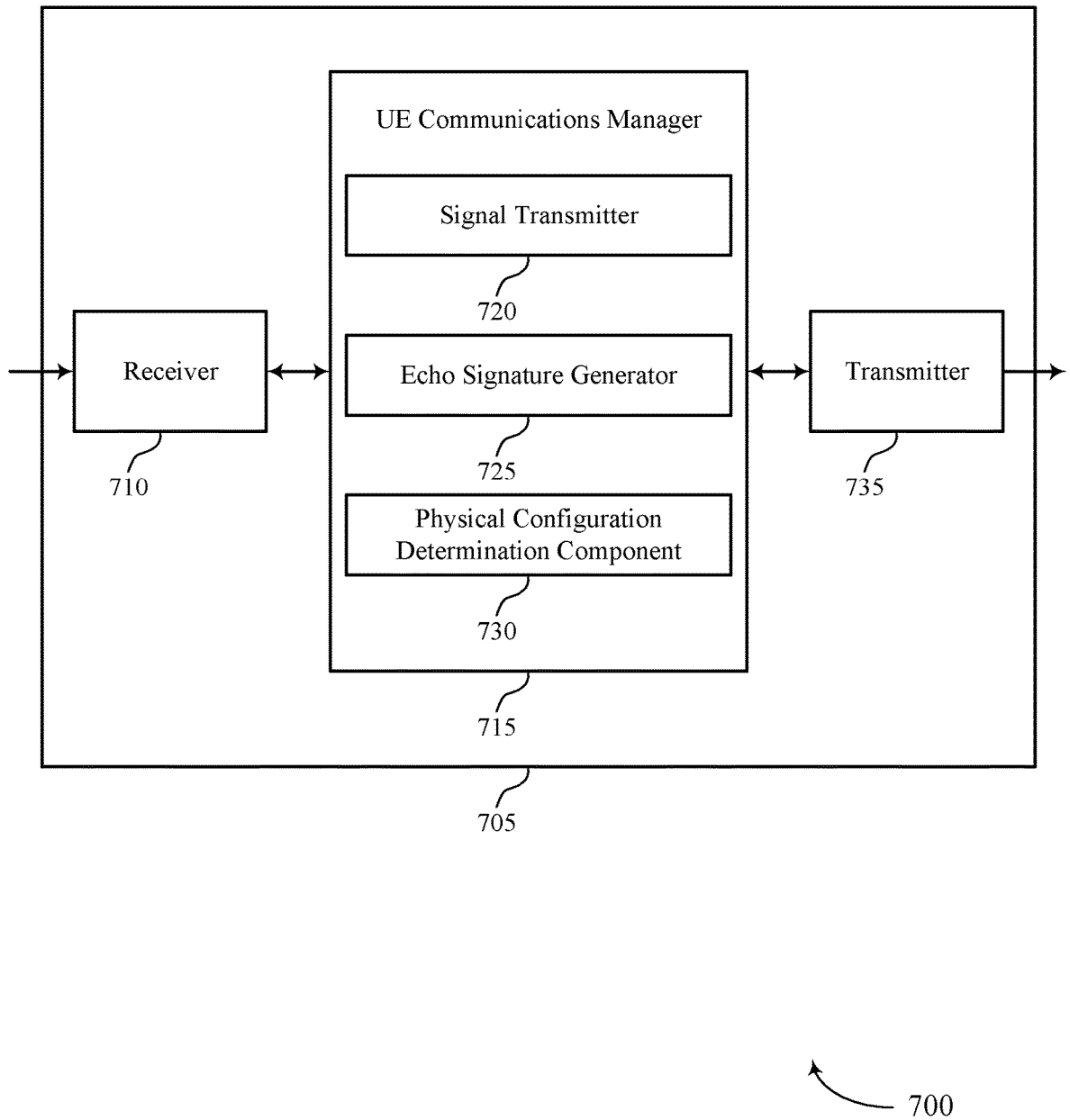

FIG. 7 shows a block diagram 700 of a device 705 in accordance with aspects of the present disclosure. The device 705 may be an example of aspects of a device 605, or a UE 115 as described herein. The device 705 may include a receiver 710, a UE communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to modem-based form factor sensor, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a signal transmitter 720, an echo signature generator 725, and a physical configuration determination component 730. The UE communications manager 715 may be an example of aspects of the UE communications manager 910 described herein.

The signal transmitter 720 may transmit a signal from a first antenna element.

The echo signature generator 725 may generate an echo signature of the signal based on detecting an echo of the signal at a second antenna element that differs from the first antenna element.

The physical configuration determination component 730 may determine that the UE is in a first physical configuration of the set of different physical configurations based on comparing the echo signature to a set of different echo signatures.

Figure 9:
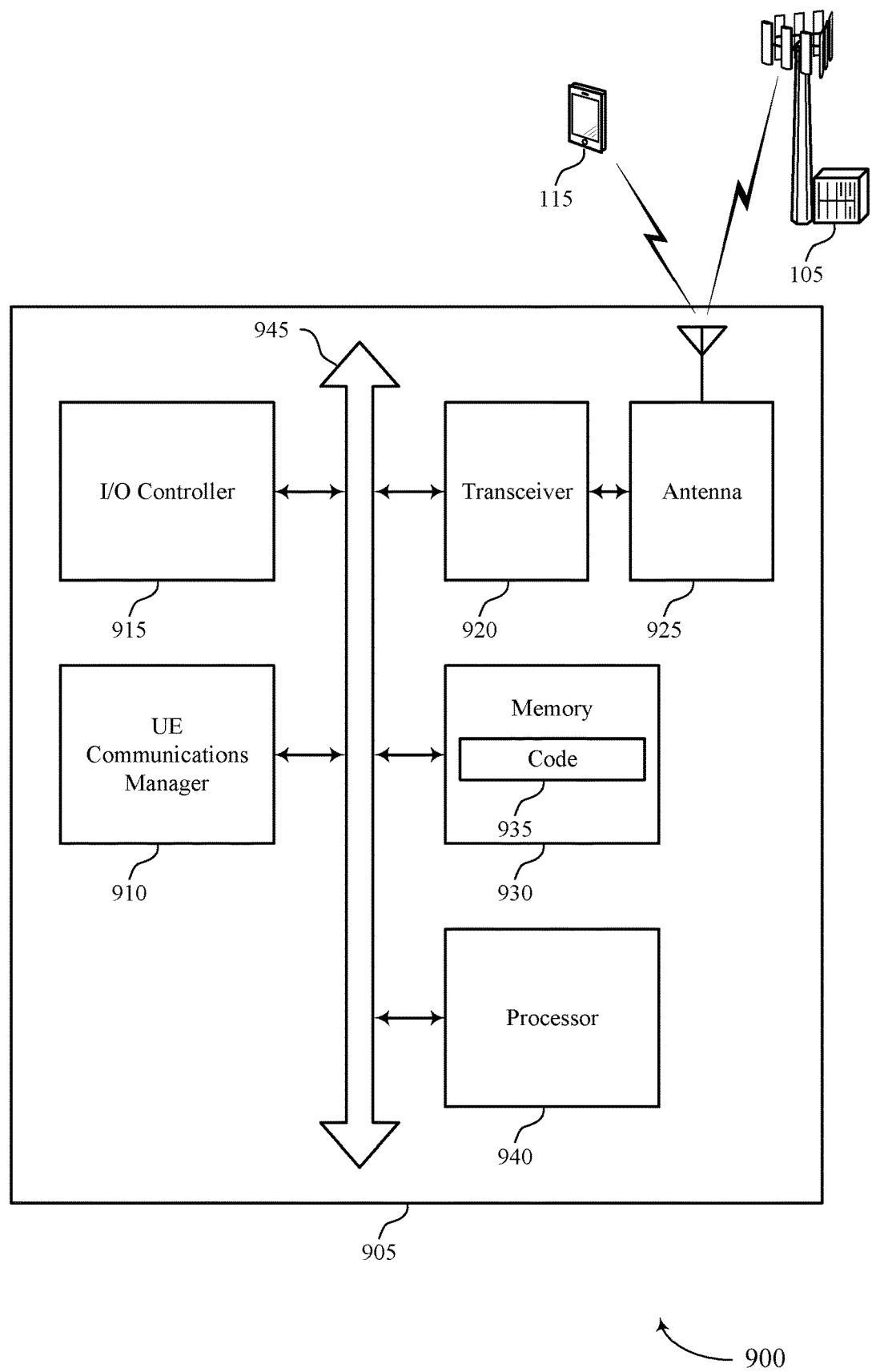
FIG. 9 shows a diagram of a system including a device in accordance with aspects of the present disclosure.

Based on techniques for efficiently performing operating system functions, a processor of a UE 115 (e.g., controlling the receiver 710, the transmitter 735, or a transceiver 920 as described with respect to FIG. 9) may increase system efficiency and decrease unnecessary processing at a device. For example, when the processor determines the physical configuration of the UE 115 (e.g., device 705), the processor may then perform a certain system function, such as turning the display of the UE 115 on or off faster to provide more efficient usage of the UE 115.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
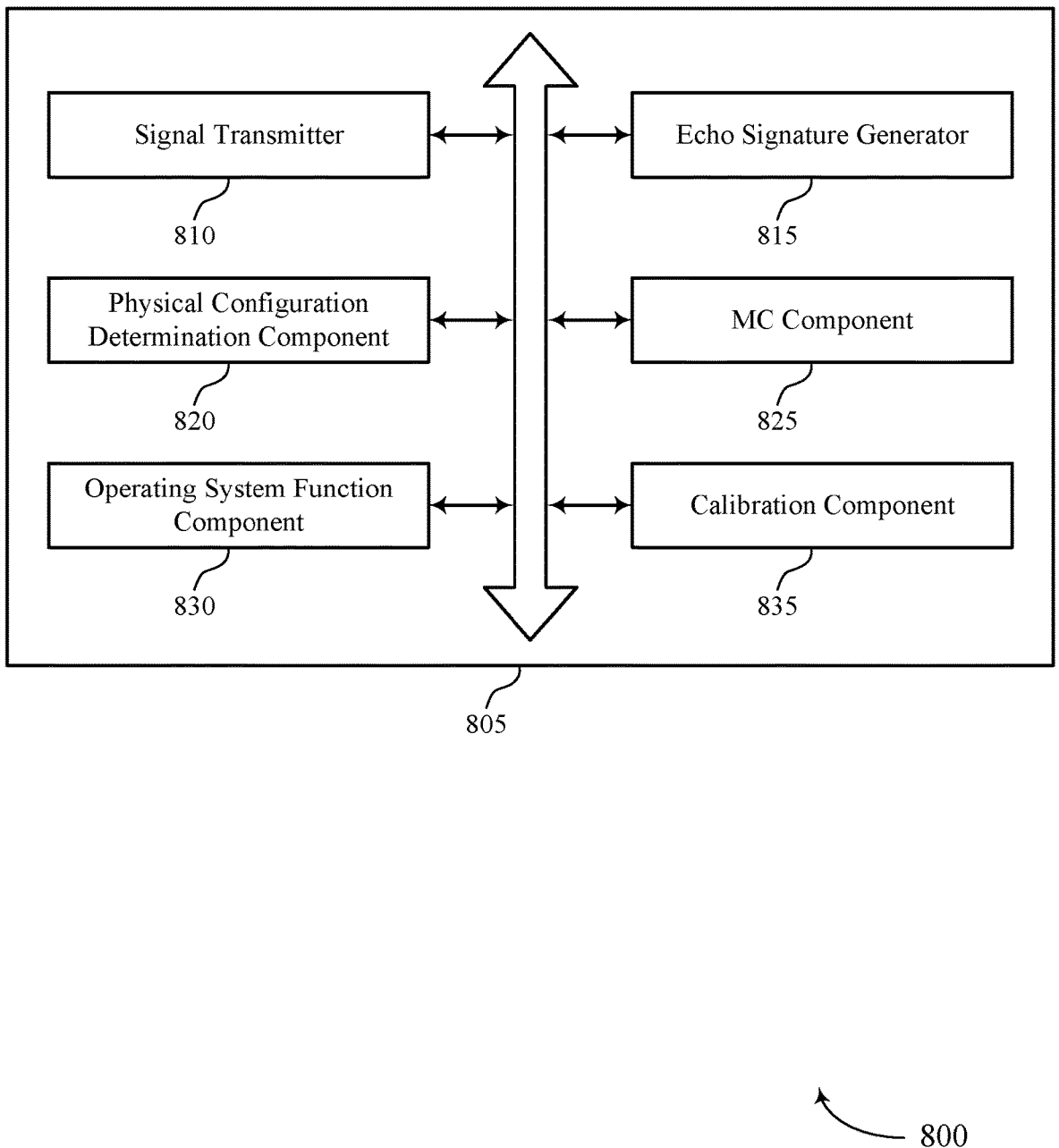
FIG. 8 shows a block diagram of a UE communications manager in accordance with aspects of the present disclosure.

FIG. 8 shows a block diagram 800 of a UE communications manager 805 in accordance with aspects of the present disclosure. The UE communications manager 805 may be an example of aspects of a UE communications manager 615, a UE communications manager 715, or a UE communications manager 910 described herein. The UE communications manager 805 may include a signal transmitter 810, an echo signature generator 815, a physical configuration determination component 820, an MC component 825, an operating system function component 830, and a calibration component 835. Each of these modules may communicate, directly or indirectly, with one another (e.g., via one or more buses).

The signal transmitter 810 may transmit a signal from a first antenna element.

The echo signature generator 815 may generate an echo signature of the signal based on detecting an echo of the signal at a second antenna element that differs from the first antenna element. In some cases, an antenna panel of the UE may include the first antenna element and the second antenna element. Additionally or alternatively, a first antenna panel of the UE may include the first antenna element, and a second antenna panel of the UE may include the second antenna element. In some examples, the echo signature generator 815 may generate the echo signature of the signal based on detecting a set of echoes of the signal at a set of antenna elements that differ from the first antenna element. Additionally or alternatively, the echo signature generator 815 may determine an amount of delay between transmission of the signal from the first antenna element and detection of the echo of the signal at the second antenna element. In some cases, the echo signature indicates a received power of the echo of the signal, a delay between transmission of the signal from the first antenna element and detection of the echo of the signal at the second antenna element, a delay spread of the signal, an angular spread of the signal, a power spectrum of the signal, or any combination thereof.

The physical configuration determination component 820 may determine that the UE is in a first physical configuration of the set of different physical configurations based on comparing the echo signature to a set of different echo signatures. In some examples, the physical configuration determination component 820 may receive a reflector indication from an exposure sensor performing exposure sensing indicating presence or absence of a reflector near the first antenna element, the second antenna element, or both, where the detecting is based on the reflector indication. In some cases, the UE may determine it is in the first physical configuration through a modem sensor of the UE. Additionally, the first physical configuration may correspond to the UE being in an opened physical configuration, a partially opened physical configuration, or a closed physical configuration.

The MC component 825 may generate the echo signature of the signal based on mitigating MC between the first antenna element and the second antenna element. Additionally or alternatively, the MC component 825 may identify at least one antenna element being used by an exposure sensor for exposure sensing and may cancel MC from the echo signature corresponding to the exposure sensing.

The operating system function component 830 may perform an operating system function corresponding to the first physical configuration based on the determining that the UE is in the first physical configuration. Additionally or alternatively, the operating system function component 830 may control a display functionality of the UE based on the first physical configuration, where the display functionality includes an on-off setting of the UE, a brightness setting, one or more display menu options, a display background image, or a combination thereof. In some examples, the operating system function component 830 may switch off a subsystem (e.g., a display) of the UE based on the first physical configuration being a closed physical configuration. Additionally or alternatively, the operating system function component 830 may switch on a subsystem (e.g., a display) of the UE based on the first physical configuration being a partially open or an open physical configuration.

The calibration component 835 may calibrate the set of different echo signatures based on determining that that the UE includes a case (e.g., or a similar add-on). In some examples, the calibration component 835 may prompt a user to place the UE in one or more of the set of different physical configurations. The calibration component 835 may then transmit a second wireless signal via the first antenna element when in each of the one or more of the set of different physical configurations based on the prompting and may adjust one or more of the set of different echo signatures based on measurements of the second wireless signal when in each of the one or more of the set of different physical configurations.

FIG. 9 shows a diagram of a system 900 including a device 905 in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may transmit a signal from a first antenna element. Additionally, the UE communications manager 910 may generate an echo signature of the signal based on detecting an echo of the signal at a second antenna element that differs from the first antenna element. In some cases, the UE communications manager 910 may determine that the UE is in a first physical configuration of the set of different physical configurations based on comparing the echo signature to a set of different echo signatures.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, using wired or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting modem-based form factor sensor).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
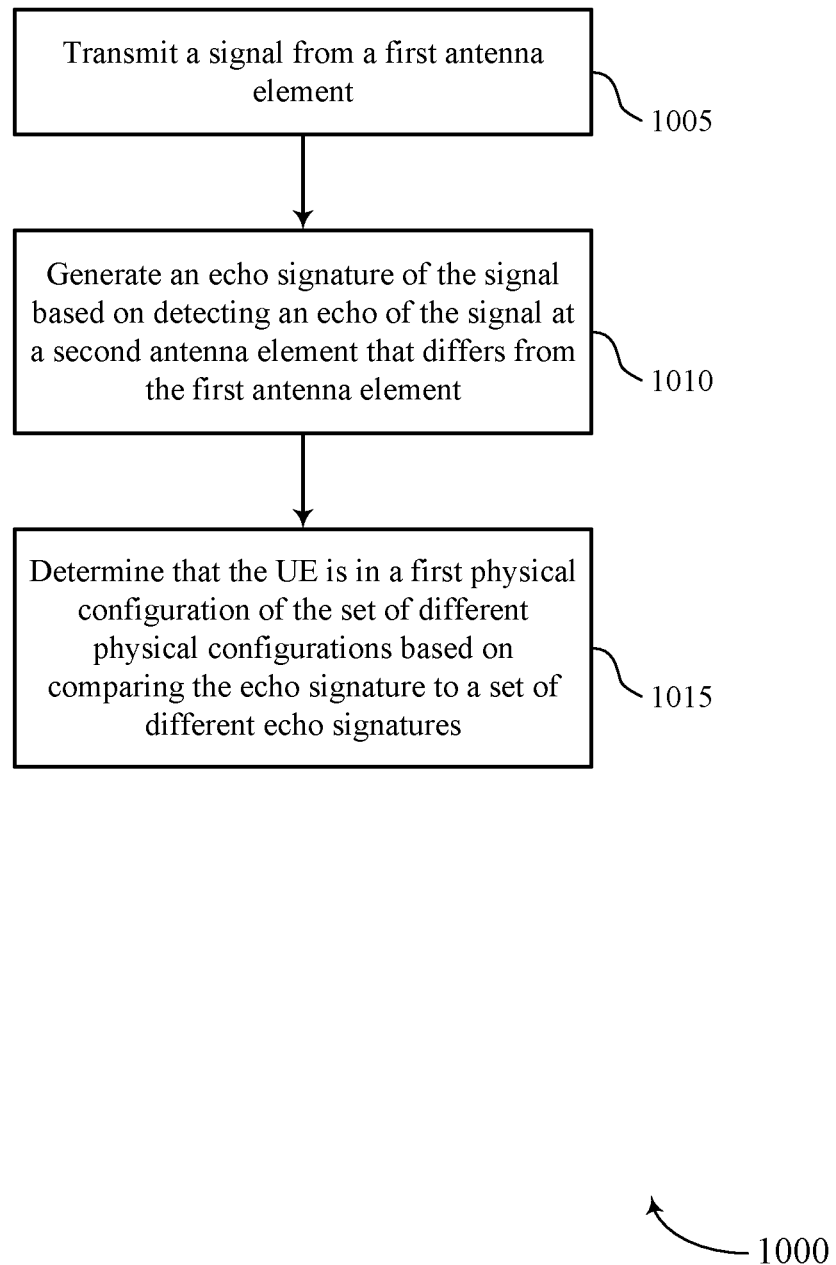
FIGS. 10 through 14 show flowcharts illustrating methods in accordance with aspects of the present disclosure.

FIG. 10 shows a flowchart illustrating a method 1000 in accordance with aspects of the present disclosure. The operations of method 1000 may be implemented by a UE 115 or its components as described herein. For example, the operations of method 1000 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may transmit a signal from a first antenna element. The operations of 1005 may be performed according to the methods described herein. In some examples, aspects of the operations of 1005 may be performed by a signal transmitter as described with reference to FIGS. 6 through 9.

At 1010, the UE may generate an echo signature of the signal based on detecting an echo of the signal at a second antenna element that differs from the first antenna element. The operations of 1010 may be performed according to the methods described herein. In some examples, aspects of the operations of 1010 may be performed by an echo signature generator as described with reference to FIGS. 6 through 9.

At 1015, the UE may determine that the UE is in a first physical configuration of the set of different physical configurations based on comparing the echo signature to a set of different echo signatures. The operations of 1015 may be performed according to the methods described herein. In some examples, aspects of the operations of 1015 may be performed by a physical configuration determination component as described with reference to FIGS. 6 through 9.

Figure 11:
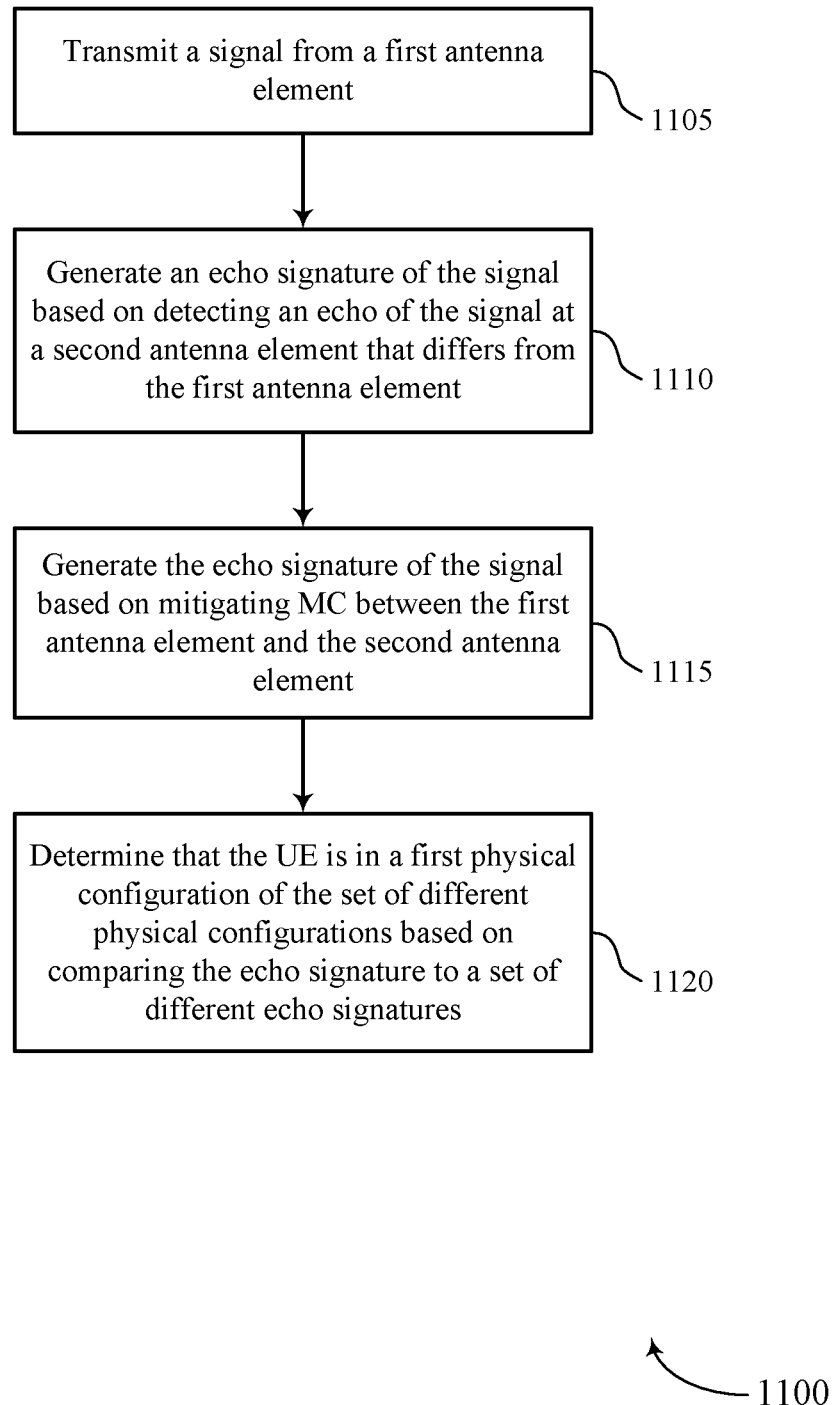

FIG. 11 shows a flowchart illustrating a method 1100 in accordance with aspects of the present disclosure. The operations of method 1100 may be implemented by a UE 115 or its components as described herein. For example, the operations of method 1100 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may transmit a signal from a first antenna element. The operations of 1105 may be performed according to the methods described herein. In some examples, aspects of the operations of 1105 may be performed by a signal transmitter as described with reference to FIGS. 6 through 9.

At 1110, the UE may generate an echo signature of the signal based on detecting an echo of the signal at a second antenna element that differs from the first antenna element. The operations of 1110 may be performed according to the methods described herein. In some examples, aspects of the operations of 1110 may be performed by an echo signature generator as described with reference to FIGS. 6 through 9.

At 1115, the UE may generate the echo signature of the signal based on mitigating MC between the first antenna element and the second antenna element. The operations of 1115 may be performed according to the methods described herein. In some examples, aspects of the operations of 1115 may be performed by an MC component as described with reference to FIGS. 6 through 9.

At 1120, the UE may determine that the UE is in a first physical configuration of the set of different physical configurations based on comparing the echo signature to a set of different echo signatures. The operations of 1120 may be performed according to the methods described herein. In some examples, aspects of the operations of 1120 may be performed by a physical configuration determination component as described with reference to FIGS. 6 through 9.

Figure 12:
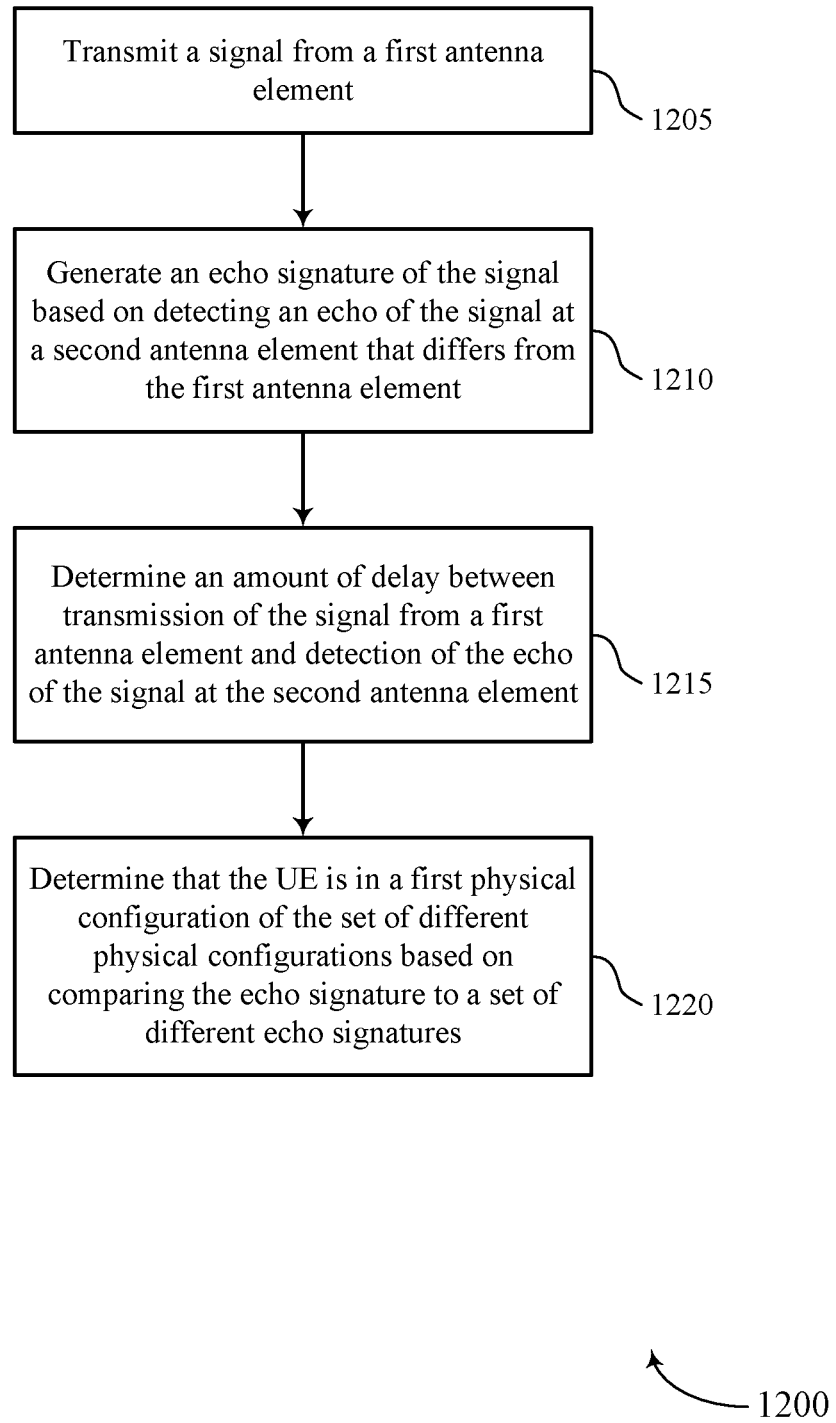

FIG. 12 shows a flowchart illustrating a method 1200 in accordance with aspects of the present disclosure. The operations of method 1200 may be implemented by a UE 115 or its components as described herein. For example, the operations of method 1200 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may transmit a signal from a first antenna element. The operations of 1205 may be performed according to the methods described herein. In some examples, aspects of the operations of 1205 may be performed by a signal transmitter as described with reference to FIGS. 6 through 9.

At 1210, the UE may generate an echo signature of the signal based on detecting an echo of the signal at a second antenna element that differs from the first antenna element. The operations of 1210 may be performed according to the methods described herein. In some examples, aspects of the operations of 1210 may be performed by an echo signature generator as described with reference to FIGS. 6 through 9.

At 1215, the UE may determine an amount of delay between transmission of the signal from the first antenna element and detection of the echo of the signal at the second antenna element. The operations of 1215 may be performed according to the methods described herein. In some examples, aspects of the operations of 1215 may be performed by an echo signature generator as described with reference to FIGS. 6 through 9.

At 1220, the UE may determine that the UE is in a first physical configuration of the set of different physical configurations based on comparing the echo signature to a set of different echo signatures. The operations of 1220 may be performed according to the methods described herein. In some examples, aspects of the operations of 1220 may be performed by a physical configuration determination component as described with reference to FIGS. 6 through 9.

Figure 13:
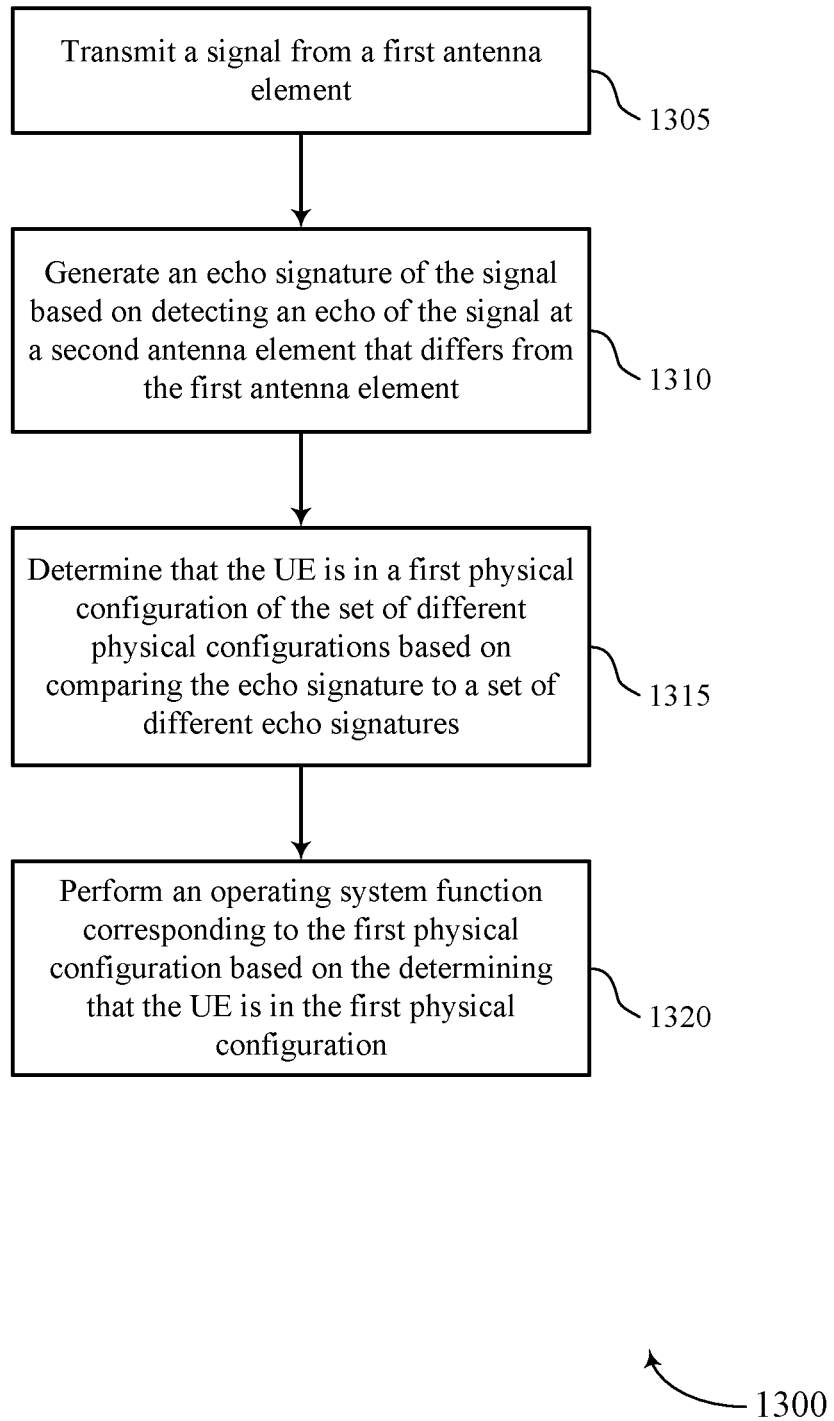

FIG. 13 shows a flowchart illustrating a method 1300 in accordance with aspects of the present disclosure. The operations of method 1300 may be implemented by a UE 115 or its components as described herein. For example, the operations of method 1300 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1305, the UE may transmit a signal from a first antenna element. The operations of 1305 may be performed according to the methods described herein. In some examples, aspects of the operations of 1305 may be performed by a signal transmitter as described with reference to FIGS. 6 through 9.

At 1310, the UE may generate an echo signature of the signal based on detecting an echo of the signal at a second antenna element that differs from the first antenna element. The operations of 1310 may be performed according to the methods described herein. In some examples, aspects of the operations of 1310 may be performed by an echo signature generator as described with reference to FIGS. 6 through 9.

At 1315, the UE may determine that the UE is in a first physical configuration of the set of different physical configurations based on comparing the echo signature to a set of different echo signatures. The operations of 1315 may be performed according to the methods described herein. In some examples, aspects of the operations of 1315 may be performed by a physical configuration determination component as described with reference to FIGS. 6 through 9.

At 1320, the UE may perform an operating system function corresponding to the first physical configuration based on the determining that the UE is in the first physical configuration. The operations of 1320 may be performed according to the methods described herein. In some examples, aspects of the operations of 1320 may be performed by an operating system function component as described with reference to FIGS. 6 through 9.

Figure 14:
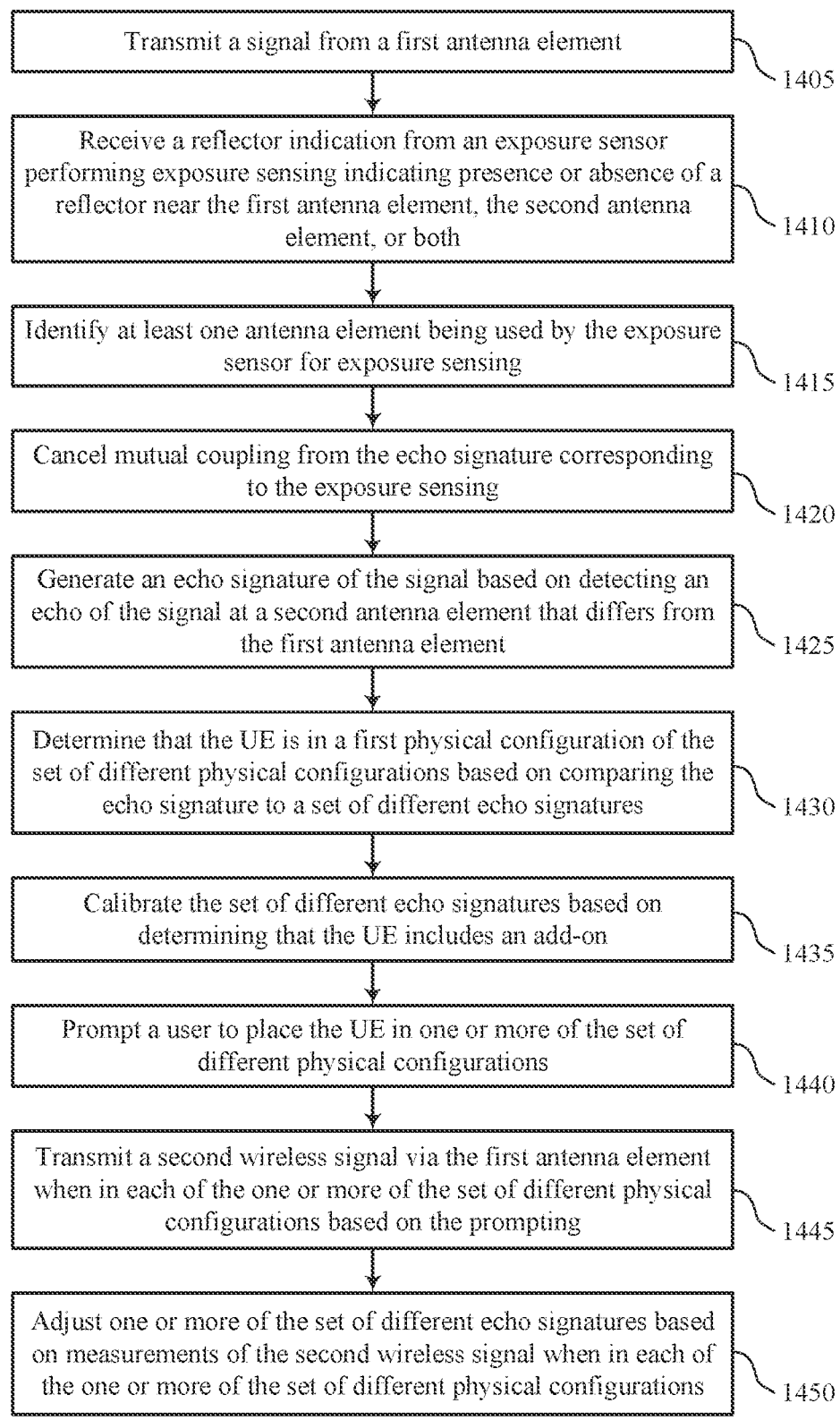

FIG. 14 shows a flowchart illustrating a method 1400 in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may transmit a signal from a first antenna element. The operations of 1405 may be performed according to the methods described herein. In some examples, aspects of the operations of 1405 may be performed by a signal transmitter as described with reference to FIGS. 6 through 9.

At 1410, the UE may receive a reflector indication from an exposure sensor performing exposure sensing indicating presence or absence of a reflector near the first antenna element, the second antenna element, or both. The operations of 1410 may be performed according to the methods described herein. In some examples, aspects of the operations of 1410 may be performed by a physical configuration determination component as described with reference to FIGS. 6 through 9.

At 1415, the UE may identify at least one antenna element being used by the exposure sensor for exposure sensing. The operations of 1415 may be performed according to the methods described herein. In some examples, aspects of the operations of 1415 may be performed by an MC component as described with reference to FIGS. 6 through 9.

At 1420, the UE may cancel mutual coupling from the echo signature corresponding to the exposure sensing. The operations of 1420 may be performed according to the methods described herein. In some examples, aspects of the operations of 1420 may be performed by an MC component as described with reference to FIGS. 6 through 9.

At 1425, the UE may generate an echo signature of the signal based on detecting an echo of the signal at a second antenna element that differs from the first antenna element. The operations of 1425 may be performed according to the methods described herein. In some examples, aspects of the operations of 1425 may be performed by an echo signature generator as described with reference to FIGS. 6 through 9.

At 1430, the UE may determine that the UE is in a first physical configuration of the set of different physical configurations based on comparing the echo signature to a set of different echo signatures. The operations of 1430 may be performed according to the methods described herein. In some examples, aspects of the operations of 1430 may be performed by a physical configuration determination component as described with reference to FIGS. 6 through 9.

At 1435, the UE may calibrate the set of different echo signatures based on determining that that the UE includes an add-on, such as a case. The operations of 1435 may be performed according to the methods described herein. In some examples, aspects of the operations of 1435 may be performed by a calibration component as described with reference to FIGS. 6 through 9.

At 1440, the UE may prompt a user to place the UE in one or more of the set of different physical configurations. The operations of 1440 may be performed according to the methods described herein. In some examples, aspects of the operations of 1440 may be performed by a calibration component as described with reference to FIGS. 6 through 9.

At 1445, the UE may transmit a second wireless signal via the first antenna element when in each of the one or more of the set of different physical configurations based on the prompting. The operations of 1445 may be performed according to the methods described herein. In some examples, aspects of the operations of 1445 may be performed by a calibration component as described with reference to FIGS. 6 through 9.

At 1450, the UE may adjust one or more of the set of different echo signatures based on measurements of the second wireless signal when in each of the one or more of the set of different physical configurations. The operations of 1450 may be performed according to the methods described herein. In some examples, aspects of the operations of 1450 may be performed by a calibration component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method at a user equipment (UE) that is configured to be positioned in a plurality of different physical configurations, comprising:
   transmitting a signal from a first antenna element;
   generating an echo signature of the signal based at least in part on detecting an echo of the signal at a second antenna element that differs from the first antenna element; and
   determining, by a modem sensor of the UE, that the UE is in a first physical configuration of the plurality of different physical configurations based at least in part on comparing the echo signature to a plurality of different echo signatures.

2. The method of claim 1, wherein generating the echo signature of the signal further comprises:
   generating the echo signature of the signal based at least in part on detecting a plurality of echoes of the signal at a plurality of antenna elements that differ from the first antenna element.

3. The method of claim 1, wherein generating the echo signature of the signal further comprises:
   generating the echo signature of the signal based at least in part on mitigating mutual coupling between the first antenna element and the second antenna element.

4. The method of claim 1, wherein the echo signature indicates a received power of the echo of the signal.

5. The method of claim 1, further comprising:
   performing an operating system function corresponding to the first physical configuration based at least in part on the determining that the UE is in the first physical configuration.

6. The method of claim 5, wherein performing the operating system function further comprises:
   controlling a display functionality of the UE based at least in part on the first physical configuration, wherein the display functionality comprises an on-off setting of the UE, a brightness setting, one or more display menu options, a display background image, or a combination thereof.

7. The method of claim 5, wherein performing the operating system function further comprises:
   switching on a subsystem of the UE based at least in part on the first physical configuration being a partially open or an open physical configuration; or
   switching off the subsystem of the UE based at least in part on the first physical configuration being a closed physical configuration.

8. The method of claim 1, further comprising:
   calibrating the plurality of different echo signatures based at least in part on determining that that the UE comprises a case.

9. The method of claim 8, wherein calibrating the plurality of different echo signatures further comprises:
prompting a user to place the UE in one or more of the plurality of different physical configurations;
transmitting a second wireless signal via the first antenna element when in each of the one or more of the plurality of different physical configurations based at least in part on the prompting; and
adjusting one or more of the plurality of different echo signatures based at least in part on measurements of the second wireless signal when in each of the one or more of the plurality of different physical configurations.

10. The method of claim 1, wherein generating the echo signature of the signal further comprises:
identifying at least one antenna element being used by an exposure sensor for exposure sensing; and
cancelling mutual coupling from the echo signature corresponding to the exposure sensing.

11. The method of claim 1, wherein determining that the UE is in the first physical configuration further comprises:
receiving a reflector indication from an exposure sensor performing exposure sensing indicating presence or absence of a reflector near the first antenna element, the second antenna element, or both, wherein the detecting is based at least in part on the reflector indication.

12. The method of claim 1, wherein:
an antenna panel of the UE comprises the first antenna element and the second antenna element; or
a first antenna panel of the UE comprises the first antenna element and a second antenna panel of the UE comprises the second antenna element.

13. The method of claim 1, wherein the echo signature indicates a delay between transmission of the signal from the first antenna element and detection of the echo of the signal at the second antenna element, a delay spread of the signal, an angular spread of the signal, a power spectrum of the signal, or any combination thereof.

14. The method of claim 1, wherein the first physical configuration corresponds to the UE being in an opened physical configuration, a partially opened physical configuration, or a closed physical configuration.

15. An apparatus at a user equipment (UE) that is configured to be positioned in a plurality of different physical configurations, comprising:
a processor,
memory in electronic communication with the processor; and
instructions stored in the memory and executable by the processor to cause the apparatus to:
transmit a signal from a first antenna element;
generate an echo signature of the signal based at least in part on detecting an echo of the signal at a second antenna element that differs from the first antenna element; and
determine, by a modem sensor of the UE, that the UE is in a first physical configuration of the plurality of different physical configurations based at least in part on comparing the echo signature to a plurality of different echo signatures.

16. The apparatus of claim 15, wherein the instructions to generate the echo signature of the signal further are executable by the processor to cause the apparatus to:
generate the echo signature of the signal based at least in part on detecting a plurality of echoes of the signal at a plurality of antenna elements that differ from the first antenna element.

17. The apparatus of claim 15, wherein the instructions to generate the echo signature of the signal further are executable by the processor to cause the apparatus to:
generate the echo signature of the signal based at least in part on mitigating mutual coupling between the first antenna element and the second antenna element.

18. The apparatus of claim 15, wherein the echo signature indicates a received power of the echo of the signal.

19. The apparatus of claim 15, wherein the instructions are further executable by the processor to cause the apparatus to:
perform an operating system function corresponding to the first physical configuration based at least in part on the determining that the UE is in the first physical configuration.

20. The apparatus of claim 19, wherein the instructions to perform the operating system function are further executable by the processor to cause the apparatus to:
control a display functionality of the UE based at least in part on the first physical configuration, wherein the display functionality comprises an on-off setting of the UE, a brightness setting, one or more display menu options, a display background image, or a combination thereof.

21. The apparatus of claim 19, wherein the instructions to perform the operating system function are further executable by the processor to cause the apparatus to:
switch on a subsystem of the UE based at least in part on the first physical configuration being a partially open or an open physical configuration; or
switch off the subsystem of the UE based at least in part on the first physical configuration being a closed physical configuration.

22. The apparatus of claim 15, wherein the instructions are further executable by the processor to cause the apparatus to:
calibrate the plurality of different echo signatures based at least in part on determining that that the UE comprises a case.

23. The apparatus of claim 22, further comprising a transmitter, wherein the instructions to calibrate the plurality of different echo signatures further are executable by the processor to cause the apparatus to:
prompt a user to place the UE in one or more of the plurality of different physical configurations;
transmit, via the transmitter, a second wireless signal via the first antenna element when in each of the one or more of the plurality of different physical configurations based at least in part on the prompting; and
adjust one or more of the plurality of different echo signatures based at least in part on measurements of the second wireless signal when in each of the one or more of the plurality of different physical configurations.

24. The apparatus of claim 15, wherein the instructions to generate the echo signature of the signal are further executable by the processor to cause the apparatus to:
identify at least one antenna element being used by an exposure sensor for exposure sensing; and
cancel mutual coupling from the echo signature corresponding to the exposure sensing.

25. The apparatus of claim 15, wherein the instructions to determine that the UE is in the first physical configuration further are executable by the processor to cause the apparatus to:
receive a reflector indication from an exposure sensor performing exposure sensing indicating presence or absence of a reflector near the first antenna element, the second antenna element, or both, wherein the detecting is based at least in part on the reflector indication.

26. The apparatus of claim 15, wherein:
an antenna panel of the UE comprises the first antenna element and the second antenna element; or
a first antenna panel of the UE comprises the first antenna element and a second antenna panel of the UE comprises the second antenna element.

27. The apparatus of claim 15, wherein the echo signature indicates a delay between transmission of the signal from the first antenna element and detection of the echo of the signal at the second antenna element, a delay spread of the signal, an angular spread of the signal, a power spectrum of the signal, or any combination thereof.

28. An apparatus at a user equipment (UE) that is configured to be positioned in a plurality of different physical configurations, comprising:
means for transmitting a signal from a first antenna element;
means for generating an echo signature of the signal based at least in part on detecting an echo of the signal at a second antenna element that differs from the first antenna element; and
means for determining, by a modem sensor of the UE, that the UE is in a first physical configuration of the plurality of different physical configurations based at least in part on comparing the echo signature to a plurality of different echo signatures.

29. A non-transitory computer-readable medium storing code at a user equipment (UE) that is configured to be positioned in a plurality of different physical configurations, the code comprising instructions executable by a processor to cause the UE to:
transmit a signal from a first antenna element;
generate an echo signature of the signal based at least in part on detecting an echo of the signal at a second antenna element that differs from the first antenna element; and
determine, by a modem sensor of the UE, that the UE is in a first physical configuration of the plurality of different physical configurations based at least in part on comparing the echo signature to a plurality of different echo signatures.

* * * * *